United States Patent
Farshchian et al.

(10) Patent No.: US 9,713,012 B2
(45) Date of Patent: Jul. 18, 2017

(54) METHODS, DEVICES AND SYSTEMS FOR ENABLING SIMULTANEOUS OPERATION OF DIFFERENT TECHNOLOGY BASED DEVICES OVER A SHARED FREQUENCY SPECTRUM

(71) Applicants: Masoud Farshchian, Boston, MA (US); Rouzbeh Yassini-Fard, Boston, MA (US)

(72) Inventors: Masoud Farshchian, Boston, MA (US); Rouzbeh Yassini-Fard, Boston, MA (US)

(73) Assignee: RADCOMM, INC., Boston, MA (US)

( * ) Notice: Subject to any disclaimer, the term of this patent is extended or adjusted under 35 U.S.C. 154(b) by 0 days.

(21) Appl. No.: 14/804,445

(22) Filed: Jul. 21, 2015

(65) Prior Publication Data
US 2017/0026847 A1    Jan. 26, 2017

(51) Int. Cl.
*H04W 16/14* (2009.01)
*G01S 7/02* (2006.01)
*H04W 84/12* (2009.01)

(52) U.S. Cl.
CPC ............. *H04W 16/14* (2013.01); *G01S 7/023* (2013.01); *H04W 84/12* (2013.01)

(58) Field of Classification Search
USPC ........................................................ 455/454
See application file for complete search history.

(56) References Cited

U.S. PATENT DOCUMENTS

| | | | |
|---|---|---|---|
| 7,606,193 B2 | 10/2009 | McFarland et al. | |
| 7,834,800 B1 | 11/2010 | Chhabra et al. | |
| 7,928,893 B2 | 4/2011 | Baraniuk et al. | |
| 8,818,284 B2 | 8/2014 | Hochstedler et al. | |
| 2006/0094371 A1* | 5/2006 | Nguyen | H04W 52/50 455/67.13 |
| 2013/0040577 A1* | 2/2013 | Hochstedler | H04W 16/14 455/62 |
| 2013/0260766 A1* | 10/2013 | Lee | H04W 76/028 455/436 |
| 2013/0314267 A1* | 11/2013 | Kenney | G01S 7/021 342/21 |
| 2014/0192656 A1 | 7/2014 | Chandramouli et al. | |
| 2015/0017919 A1 | 1/2015 | Kenney et al. | |

OTHER PUBLICATIONS

Holdren, J. P., and E. Lander. *Realizing the full potential of government-held spectrum to spur economic growth.* Technical Report, 2012.

(Continued)

*Primary Examiner* — Mazda Sabouri
(74) *Attorney, Agent, or Firm* — Polsinelli PC

(57) ABSTRACT

In one example embodiment, a device includes a memory configured to store computer-readable instructions therein and a processor. The processor is configured to execute the computer-readable instructions to determine a first signal of a first technology in presence of interference from at least a second signal of a second technology, the first signal and the second signal being overlappingly transmitted, the determined first signal being used for processing of information associated with the first signal.

18 Claims, 6 Drawing Sheets

(56) References Cited

OTHER PUBLICATIONS

Griffiths, Hugh, Simon Watts, and Mike Wicks. "Radar Spectrum Engineering and Management: Technical and Regulatory Issues." *Proceedings of the Institute of Electrical and Electronics Engineers (IEEE)* (2014).
Haykin, Simon. "Cognitive radio: brain-empowered wireless communications." *Selected Areas in Communications, IEEE Journal on* 23.2 (2005): 201-220.
Locke, Gary, and Lawrence Strickling. "An Assessment of the Near Term Viability of Accommodating Wireless Broadband Systems in the 1675-1710 MHz, 1755-1780 MHz, 3500-3650 MHz, 4200-4220 MHz, 4380-4400 MHz Bands." *U. S. Department of Commerce*, Washington, DC, Oct. 1 (2010). <http://www.ntia.doc.gov/report/2010/assessment-near-term-viability-accommodating-wireless-broadband-systems-1675-1710-mhz-17>.
International Telecommunications Union, Radiocommunication Sector (ITU-R), "Technical and operational aspects of ground-based meteorological radars," ITU-R Recommendation M.1849, Jun. 2009. http://www.itu.int/dms_pubrec/itu-r/rec/m/R-REC-M.1849-0-200906-I!!PDF-E.pdf.
Sanders, F. H., R. Sole, B. Bedford, D. Franc and T. Pawlowitz, "Effects of RF interference on radar receivers," NTIA Technical Report TR-06-444, U.S. Dept. of Commerce, Sep. 2006. http://www.its.bldrdoc.gov/publications/2481.aspx.
Khawar, Awais, Ahmed Abdel-Hadi, and T. Charles Clancy. "Spectrum sharing between S-band radar and LTE cellular system: A spatial approach." *Dynamic Spectrum Access Networks (DYSPAN), 2014 IEEE International Symposium on.* IEEE, 2014.
Deng, Hai, and Braham Himed. "Interference mitigation processing for spectrum-sharing between radar and wireless communications systems." *Aerospace and Electronic Systems, IEEE Transactions on* 49.3 (2013): 1911-1919.
Geng, Zhe, Hai Deng, and Braham Himed. "Adaptive Radar Beamforming for Interference Mitigation in Radar-Wireless Spectrum Sharing." *Signal Processing Letters, IEEE* 22.4 (2015): 484-488.
Richards, Mark A. *Fundamentals of radar signal processing.* Tata McGraw-Hill Education, 2005. CHP3.
Boyd, Stephen, et al. "Distributed optimization and statistical learning via the alternating direction method of multipliers." *Foundations and Trends® in Machine Learning* 3.1 (2011): 1-122.
Picciolo, Michael, Jacob D. Griesbach, and Karl Gerlach. "Adaptive LFM waveform diversity." *Radar Conference, 2008. RADAR'08. IEEE.* IEEE, 2008.
Selesnick, Ivan W., Ankit Parekh, and Ilker Bayram. "Convex 1-D Total Variation Denoising with Non-convex Regularization." *IEEE Signal Processing Letters,* 22(2):141-144, Feb. 2015.
Chen, Po-Yu, and Ivan W. Selesnick. "Group-Sparse Signal Denoising: Non-Convex Regularization, Convex Optimization." *IEEE Transactions on Signal Processing* 62.13 (2014): 3464-3478.
Afonso, Manya V., José M. Bioucas-Dias, and Mário AT Figueiredo. "Fast image recovery using variable splitting and constrained optimization." *Image Processing, IEEE Transactions on* 19.9 (2010): 2345-2356.
Goldstein, Tom, et al. "Fast alternating direction optimization methods." *SIAM Journal on Imaging Sciences* 7.3 (2014): 1588-1623.
Combettes, Patrick L.. And Jean-Christophe Pesquet. "Proximal splitting methods in signal processing." *Fixed-point algorithms for inverse problems in science and engineering.* Springer New York, 2011. 185-212.
Fuchs, J-J. "Multipath time-delay detection and estimation." *Signal Processing, IEEE Transactions on* 47.1 (1999): 237-243.

* cited by examiner

METHODS, DEVICES AND SYSTEMS FOR ENABLING SIMULTANEOUS OPERATION OF DIFFERENT TECHNOLOGY BASED DEVICES OVER A SHARED FREQUENCY SPECTRUM

BACKGROUND

The radio-frequency (RF) electromagnetic spectrum, extending from below 1 MHz to above 100 GHz, represents a finite resource that is shared by variety of devices including devices operating using wireless communications standards, radar devices, television broadcasts, radio navigation and other RF devices. The increasing demand by consumers for higher data rates induces competition among RF devices for accessing the finite RF spectrum. Accordingly, appropriate federal agencies have recently recommended that 1000 MHz of federally-controlled RF spectrum should be freed or shared with the private industry in order to meet the ever growing need for wireless communications-based services.

Radars are used for a variety of applications including air-traffic-control, weather forecasting, automotive collision avoidance systems, ground penetrating radars for finding underground resources, altimeters for elevation measurements, geophysical monitoring of resources by synthetic aperture radar (SAR) systems, etc. Studies have shown that the effect of wireless communications interference on radar systems may severely inhibit the performance of radar devices/systems. Therefore, conventionally, when a primary device (e.g., a radar device) operates in a given spectrum (e.g., frequency band), secondary devices such as devices communicating using wireless communications technologies, have not been allowed to operate in the given spectrum.

Various solutions have been proposed for enabling the use of "white spectrum" (e.g., RF spectrum used by primary devices) by the secondary devices. This means allowing secondary wireless devices to operate when the primary wireless device(s) are not active within a frequency band and geographical area. One such proposed solution is referred to as Dynamic Spectrum Access (DSA), with Dynamic Frequency Selection (DFS) being a particular example of the DSA solution.

Another proposed solution (not currently implemented or not implemented for spectrum sharing purposes) might be radar systems such as passive systems and multiple-input multiple-output (MIMO) radars to alleviate the spectrum congestion problem and make more spectrum available for use by wireless communications systems. However these systems are much more complex than the existing deployed radar systems. Furthermore, replacements of existing radar systems may be cost prohibitive and consequently such proposed systems are not currently feasible.

Therefore, more robust methods allowing for simultaneous operation of wireless communications and radar devices/systems are desirable.

SUMMARY

Some example embodiments relate to methods, apparatuses and systems for enabling simultaneous operation of different technology based devices over a shared spectrum.

In one example embodiment, a device includes a memory configured to store computer-readable instructions therein and a processor. The processor is configured to execute the computer-readable instructions to determine a first signal of a first technology in presence of interference from at least a second signal of a second technology, the first signal and the second signal being overlappingly transmitted, the determined first signal being used for processing of information associated with the first signal.

In yet another example embodiment, the overlapping transmission of the first signal and the second signal includes transmission of the first signal and the second signal over a shared spectrum.

In yet another example embodiment, the overlapping transmission of the first signal and the second signal includes transmission of the first signal and the second signal over a shared spectrum.

In yet another example embodiment, the overlapping transmission of the first signal and the second signal includes a spatial overlap of the first signal and the second signal as well as overlaps of the first signal and the second signal in time and frequency domains.

In yet another example embodiment, the processor is further configured to receive a signal, the signal including the first signal with additive noise corresponding to at least the second signal, and minimize a cost function associated with the received signal, wherein the processor is configured to determine the first signal as possible sets of values of the first signal that minimize the cost function.

In yet another example embodiment, the processor is further configured to minimize the cost the function based on an iterative process.

In yet another example embodiment, the first signal is a radar fast-time/slow-time data matrix, and the cost function is formed based on at least the received signal, a range-frequency spectrum associated with a transmission of the first signal, a set of Doppler weights, at least one regularization function, at least one data-fidelity term, at least one regularization parameter, a step-size parameter and a power spectral density of the second signal.

In yet another example embodiment, the first signal is a radar data time-series, and the cost function is formed based on at least the received signal, a frequency response of a filter associated with a transmission of the first signal, a regularization parameter, at least one regularization function, at least one data-fidelity term, at least one regularization parameter, a step-size parameter and a power spectral density of the second signal.

In yet another example embodiment, the device is a receiver of a radar system, the first signal is a radar signal transmitted by a transmitter of the radar system, the second signal is a signal transmitted by a transmitter of a wireless communications system, the radar system operates based on the first technology, and the wireless communications system operates based on the second technology.

In yet another example embodiment, the first technology is a radar technology, and the second technology is a wireless communications standard, the wireless communications standard being at least one of a wireless local area networking standard and a radio access technology.

In yet another example embodiment, the radar system is configured to operate simultaneously with at least one additional radar system, and the processor is further configured to suppress radar signals of the least one additional radar system, when the processor determines the first signal.

In yet another example embodiment, the processor is further configured to suppress the radar signals of the least one additional radar system by adjusting power spectral densities in a cost function on frequencies on which the radar signals of the least one additional radar system are transmitted.

In one example embodiment, a device includes a memory configured to store computer-readable instructions therein and a processor. The processor is configured to determine a first signal of a first technology from a signal received at the device, the signal including at least the first signal and a second signal of a second technology transmitted for reception by the device. The processor is further configured to determine the second signal based on the signal and the first signal, the determined second signal being used for processing of information associated with the second signal.

In yet another example embodiment, the overlapping transmission of the first signal and the second signal includes transmission of the first signal and the second signal over a shared spectrum.

In yet another example embodiment, the overlapping transmission of the first signal and the second signal includes a spatial overlap of the first signal and the second signal as well as overlaps of the first signal and the second signal in time and frequency domains.

In yet another example embodiment, the processor is further configured to receive the signal, the signal including the first signal with additive noise corresponding to at least the second signal, and minimize a cost function associated with the received signal, wherein the processor is configured to determine the first signal as possible values of the first signal that minimize the cost function.

In yet another example embodiment, the processor is further configured to minimize the cost function based on an iterative process.

In yet another example embodiment, the first signal is a radar fast-time/slow-time data matrix, and the cost function is formed based on at least the received signal, a range-frequency spectrum associated with a transmission of the first signal, a set of Doppler weights, at least one regularization function, at least one data-fidelity term, at least one regularization parameter, a step-size parameter and a power spectral density of the second signal.

In yet another example embodiment, the first signal is a radar data time-series, and the cost function is formed based on at least the received signal, a frequency response of a filter associated with a transmission of the first signal, a regularization parameter, at least one regularization function, at least one data-fidelity term, at least one regularization parameter a step-size parameter and a power spectral density of the second signal.

In yet another example embodiment, the device is a receiver of a wireless communications system, the first signal is a radar signal transmitted by a transmitter of a radar system, the second signal is a signal transmitted by a transmitter of the wireless communications system, the radar system operates based on the first technology, and the wireless communications system operates based on the second technology.

In yet another example embodiment, the first technology is a radar technology, and the second technology is a wireless communications standard, the wireless communications standard being at least one of a wireless local area networking standard and a radio access technology.

In yet another example embodiment, the processor is further configured to receive the signal, the signal including the first signal, the second signal and at least one additional radar signal, determine the first signal and the at least one additional radar signal, and subtract a combination of the first signal and the at least one additional radar signal from the signal to determine the second signal.

In yet another example embodiment, the wireless communications system is configured to operate simultaneously with at least one additional wireless communications system, and the processor is further configured to suppress wireless communications signals of the least one additional wireless communications system, when the processor determines the second signal.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the present disclosure, and wherein.

DETAILED DESCRIPTION OF EXAMPLE EMBODIMENTS

Figure 1:
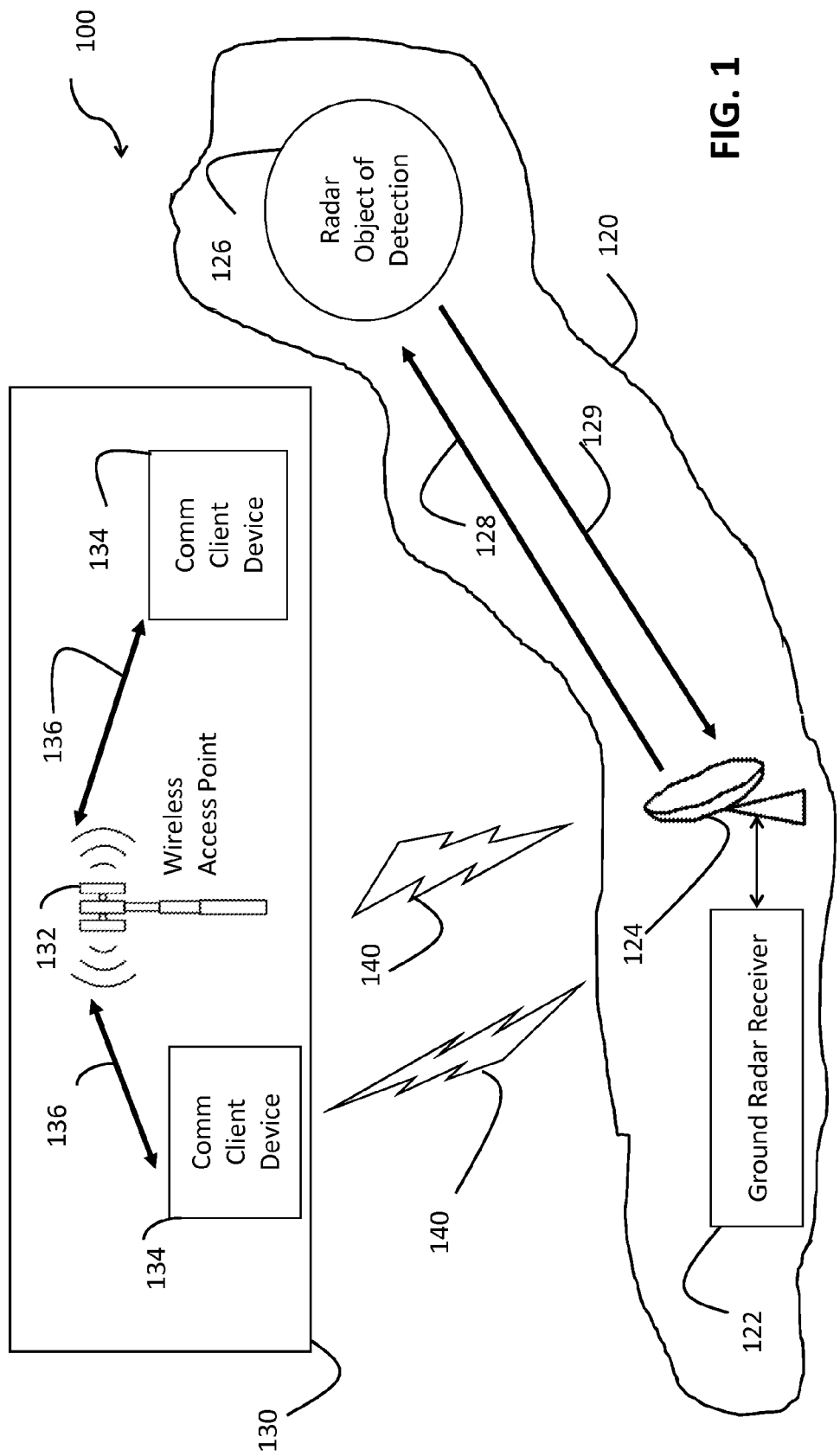
FIG. 1 illustrates a setting in which a wireless communications system and a radar system operate simultaneously, according to an example embodiment.

Various embodiments will now be described more fully with reference to the accompanying drawings. Like elements on the drawings are labeled by like reference numerals.

Detailed illustrative embodiments are disclosed herein. However, specific structural and functional details disclosed herein are merely representative for purposes of describing example embodiments. This disclosure may, however, be embodied in many alternate forms and should not be construed as limited to only the embodiments set forth herein.

Accordingly, while example embodiments are capable of various modifications and alternative forms, the embodiments are shown by way of example in the drawings and will be described herein in detail. It should be understood, however, that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprises", "comprising,", "includes" and/or "including", when used herein, specify the presence of stated features, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

In the following description, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at existing network elements. Such existing hardware may include, but is not limited to, one or more of Central Processing Units (CPUs), Digital Signal Processors (DSPs), Graphical Processing Units (GPUs), Very Large Scale Integration (VLSI) circuits, Application-Specific-Integrated-Circuits (ASICs), Field Programmable Gate Arrays (FPGAs), computers or the like.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium" or "computer readable storage medium" may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware, or microcode, the program code or code segments to perform the necessary tasks may be stored in a machine or computer readable medium such as a computer readable storage medium. When implemented in software, a processor or processors will perform the necessary tasks.

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory content. Information, arguments, parameters, data, etc. may be passed, forwarded, or transmitted via any suitable means including memory sharing, message passing, token passing, network transmission, etc.

Example embodiments described herein enable simultaneous operation of devices/systems of different technologies over a shared frequency spectrum while detrimental interference of signals of one of the different technologies on signals of another one of the different technologies is minimized.

Example embodiments described herein provide a signal processing approach, in which a first device of a first technology determines/estimates a signal transmitted according to the first technology and destined for the first device, from a mixed signal received at the first device. The mixed signal includes, among various types of interference signals, a signal simultaneously transmitted according to a second technology over the same frequency spectrum (the first and second signals overlap in time and frequency domains). The first device may then utilize the determined/estimated first signal for further processing of information associated with the first signal.

Example embodiments may be utilized in conjunction with various known or to be developed Wireless Local Area Network Technologies (WLANs). Furthermore, example embodiments may also be utilized in conjunction with Radio Access Networks (RANs) such as: Universal Mobile Telecommunications System (UMTS); Global System for Mobile communications (GSM); Advance Mobile Phone Service (AMPS) system; the Narrowband AMPS system (NAMPS); the Total Access Communications System (TACS); the Personal Digital Cellular (PDC) system; the United States Digital Cellular (USDC) system; the code division multiple access (CDMA) system described in EIA/TIA IS-95; a High Rate Packet Data (HRPD) system, Worldwide Interoperability for Microwave Access (WiMAX); 4G Long Term Evolution (LTE); Wi-Fi; Ultra Mobile Broadband (UMB); and $3^{rd}$ Generation Partnership Project LTE (3GPP LTE).

FIG. 1 illustrates a setting in which a wireless communications system and a radar system operate simultaneously, according to an example embodiment. As shown in FIG. 1, in a setting 100 two different systems co-exist. The first system is the system 120 and the second system is the system 130. The systems 120 and 130 may operate based on different technologies. In the example embodiment shown in FIG. 1, the system 120 may be a radar system and the system 130 may be a wireless communications system. However, example embodiments are not limited to wireless communications and radar systems but may encompass any two systems operating according to different technologies. For purposes of describing example embodiments, the first system 120 and the second system 130 are considered to exist in vicinity of one another or having spatially overlapping signals (i.e., the first system 120 and the second system 130 overlap spatially such that when the first system 120 and the second 130 transmit signals on the same or overlapping frequencies and same or overlapping time, the signals of each induce interference on the signals of the other of the two systems (each of the first system 120 and the second system 130 experience degradation in their performance due to the spatial overlap of the signals (e.g. in the radiated electromagnetic waves form) of the other of the two systems.)

The first system 120 may be a system that operates based on a different technology than the technology based on which the second system 130 operates. For example and as shown in FIG. 1, the first system 120 may be a radar system. The radar system 120 may include a radar receiver 122, a radar 124, and a radar object of detection 126. The radar receiver 122 may control the operation of the radar 124, as will be described below. The radar 124 may transmit a signal 128 to the radar object of detection 126. The echo/reflection of the signal 128 may be the signal 129 received back/detected by the radar 124 and processed by the radar receiver 122. The radar object of detection may be any type of object/information to be detected, imaged, tracked, processed, and/or monitored by the radar 124.

The radar system 120 may be any coherent based radar system such as a weather radar system, surveillance radar system, airport traffic radar system, ground penetrating radar system, search and rescue radar system, car radar system including those with multiple array elements and multiple antennas (MIMO). The radar may be in a staring mode, scanning mode, circling mode, stripmap mode, etc. The radar may also be in any one of an imaging, tracking, detection or other modes.

The second system 130 may include components necessary for enabling communication according to the corresponding technology. For example, in FIG. 1 and assuming that the second system 130 operates according to a wireless communications technology (e.g., GSM based wireless communications system, CDMA based communications system, etc.), the second system 130 may include a wireless access point 132 communicating with communication client devices 134 (which may be hereinafter referred to as user equipment (UE)) via exchange of signals 136. The Wireless access point 132 may differ from one wireless communications technology to another but regardless of the underlying technology, enables the UEs 134 to establish voice/data communication with other devices and/or network components.

In one example embodiment and as shown in FIG. 1, the wireless access point 132 may be a base station (e.g., macro cell base station, small cell base station, femto cell base station, etc.). However, the example embodiments are not limited thereto but may encompass any other type of access point through which the UEs 134 may establish voice/data communications with other UEs (in the same network or different networks) or other network components. For example, the wireless access point 132 may be a router, when the wireless communications system 130 is a wireless local area network (WLAN) operating according to known WLAN standards such as IEEE 802 standards. Furthermore, while some components of the second system 130 are illustrated in FIG. 1, any other component necessary for enabling wireless communication within the second system 130 is implicitly included (e.g., network access points, core network elements, etc.).

More generally, the first system 120 and the second system 130 may be systems of sensors and/or system of communication devices using the same spectrum resources where the waveforms may be electromagnetic, acoustic or otherwise. The wireless communications and radar platforms may be stationary or moving on the ground, in the air/space or at the sea.

The radar system 120 may operate in one or more frequency bands (e.g., 5 GHz band).

In one example embodiment, the signals 136 of the wireless communications system 130 and the signals 128/129 of the radar system 120 may be transmitted simultaneously over the same (or overlapping) frequency band/spectrum such that the signals 136 and 128/129 overlap in time and/or frequency domains (i.e., the signals 136 and 128/129 may be said to share a spectrum, with the shared spectrum being associated with one or more specific frequencies such as 2 GHz, 5 GHz, etc.). For example, signals 136 and 128/129 may be transmitted over the entire and/or overlapping portions of the 5 GHz frequency band. Accordingly, the signals of each of the systems 120 and 130 (e.g., signals 136, 128 and 129) may induce interference on signals of the other one of the systems 120 and 130. The interference caused by each of the signals 136 and 128/129 on the other one of the signals 136 and 128/129 is illustrated as interference signals 140 in FIG. 1.

For example, the signals 136 of the system 130 may interfere with the transmitted and received signals 128/129 of the system 120. Accordingly, the signal 129, as received at the radar receiver 122 may include both the intended signal 129 as well as the interference induced/caused by the signal 136 of the system 130, in the form of signal 140. Similarly, the signals 128/129 of the system 120 may interfere with the signals 136 of the system 130. Accordingly, the signal 136, as received at a receiver of any one or more of the components in the system 130 (e.g., a receiver of any one of the UEs 134 and/or the wireless access point 132) may include the signal 136 as well as the interference induced/caused by the signals 128/129 of the system 120, in the form of signal 140. Accordingly, and as will be described in greater detail below, example embodiments enable a receiver in each of the systems 120 and 130 to determine/estimate the corresponding one of the signals 136 or 129 from the mixture of the corresponding one of the signals 136 or 129 and the interference induced at least in part by the interference signals 140 of the other one of the systems 120 and 130.

While FIG. 1 illustrates a setting in which only two systems (system 120 and system 130) operating according to different technologies are deployed, example embodiments are not limited thereto. For example, there may be a more than two systems deployed in the setting 100 each of which operates based on a different technology and/or any pair of two or more of the deployed systems may operate based on the same technology while at least one of the deployed system operates based on a different technology. Regardless of the number of systems in the setting 100, each system's transmitted signals may induce interference such as interference signal 140 on the other systems in the setting 100.

Figure 2:
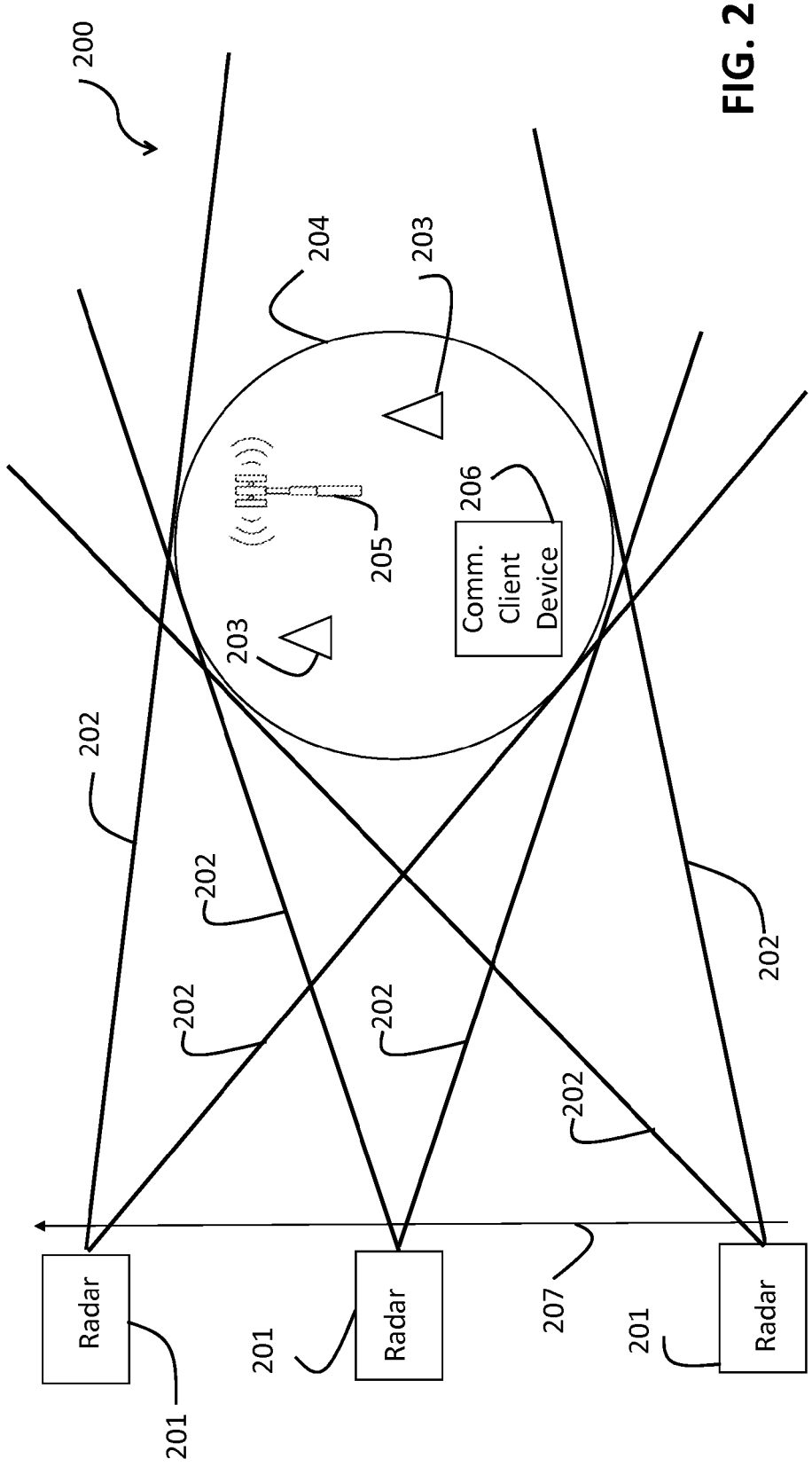
FIG. 2 illustrates a setting in which a wireless communications system and a moving radar system operate simultaneously, according to an example embodiment.

FIG. 2 illustrates a setting in which a wireless communications system and a moving system operate simultaneously, according to an example embodiment. As shown in FIG. 2, in a setting 200 two different systems co-exist (i.e., physically co-exist meaning that the two systems (and/or alternatively the signals transmitted by the two systems) are in the geographical vicinity of one another). The first system is a radar system formed by the radar 201 and the radar objects of interest 203, similar to the system 120 shown in FIG. 1, except that in FIG. 2, the radar 201 moves (electronically, mechanically, manually, etc.) along the direction 207. The moving radar system may be ship-born, airborne, satellite or moving on land. The movement of the radar 201 is shown by three different radar 201 each illustrating a different position of the radar 201 at a different location along the line/axis 207. In one example embodiment, the radar 201 may be positioned on a movable platform enabling the radar 201 to be moved to different locations. The systems shown in FIG. 2 may operate based on different technologies including wireless communications and radar systems, as also described above with reference to FIG. 1. However, example embodiments are not limited to wireless communications and radar systems but may encompass any two systems operating according to different technologies.

The second system in FIG. 2 is the system comprising the wireless access point 205 and the communication client device 206 (which may also be referred to as the user equipment (UE) 206), similar to the system 130 shown in FIG. 1. While not shown and as also described above, the second system in FIG. 2 may include any other number of system components in accordance with the technology based on which the second system operates.

In FIG. 2, at the different locations, the radar 201 may observe a radar scene 204 for detecting (and/or imaging, tracking, monitoring, etc., depending on the functionality of the radar system) one or more of the radar objects 203. The radar objects 203 may be located in the vicinity of the second system of which the wireless access point 205 and the UE 206 are part of. Accordingly, the signals of the two systems, which are transmitted overlappingly over a shared frequency spectrum/bandwidth (the shared spectrum associated with one or more particular frequencies), may interfere with one another when a radar footprint 204 formed by the main beam (or sidelobe or backlobe) 202 of the radar 201 overlaps the radiated energy from the wireless communications system formed by the wireless access point 205 and the UE 206. In one example embodiment, the signals of the two systems may interfere in time and frequency domains either completely or partially.

Figure 3:
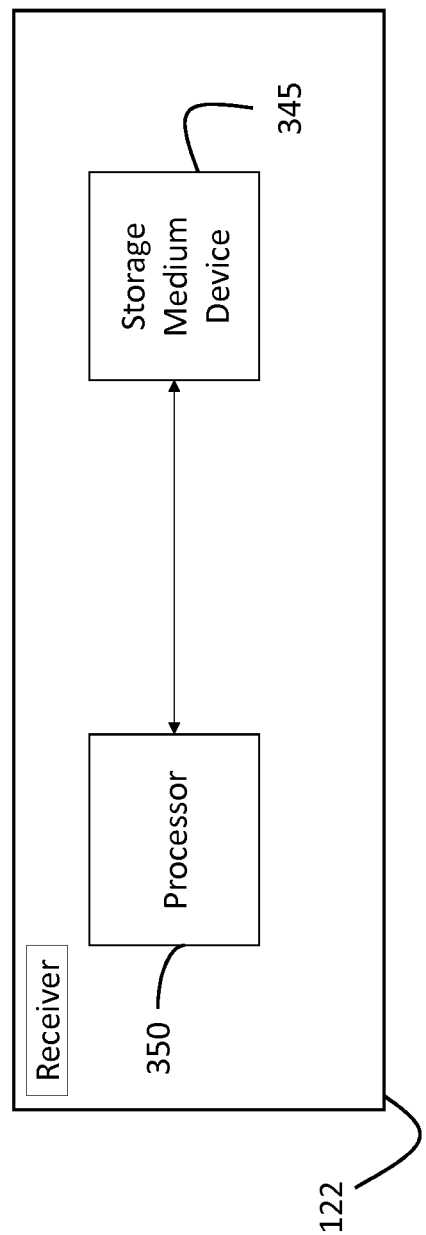
FIG. 3 illustrates a receiver for receiving signals of the first system shown in FIG. 1, according to an example embodiment.

FIG. 3 illustrates a receiver for receiving signals of the first system shown in FIG. 1, according to an example embodiment. In the example embodiment described above with reference to FIG. 1, the first system 120 is described as a radar system. However, as mentioned, the first system 120 is not limited to a radar system.

The receiver of FIG. 3 may be the radar receiver 122 of the first system 120 of FIG. 1 that is to receive an echo from the radar signal transmitted by the radar 124 to the radar object of detection 126 and reflected back to the radar 124 from the radar object of detection 126.

As shown in FIG. 3, the radar receiver 122 may include a storage medium device 345 and a processor 350. While FIG. 3 illustrates the radar receiver 122 as including two components, example embodiments are not limited thereto and the radar receiver 122 may include any number of additional components necessary for performing various functions within the radar system 120.

The storage medium device 345 may store, among other information, a set of computer-readable instructions and parameters for determining a signal of the first system 120 transmitted to the radar receiver 122 in presence of interference induced by the signal 140 described above with reference to FIG. 1, as will be described below.

The processor 350 may execute the set of computer-readable instructions for performing the functions necessary to determine a signal of the first system 120 transmitted to the radar receiver 122, as will be described below. Accordingly, the execution of the computer-readable instructions by the processor 350 may transform the processor 350 into a special purpose processor for performing the underlying functions. In addition to determining the signal of the first system 120, the processor 350 may further execute additional computer-readable instructions for processing information associated with the received signal, as will be further described below.

Figure 4:
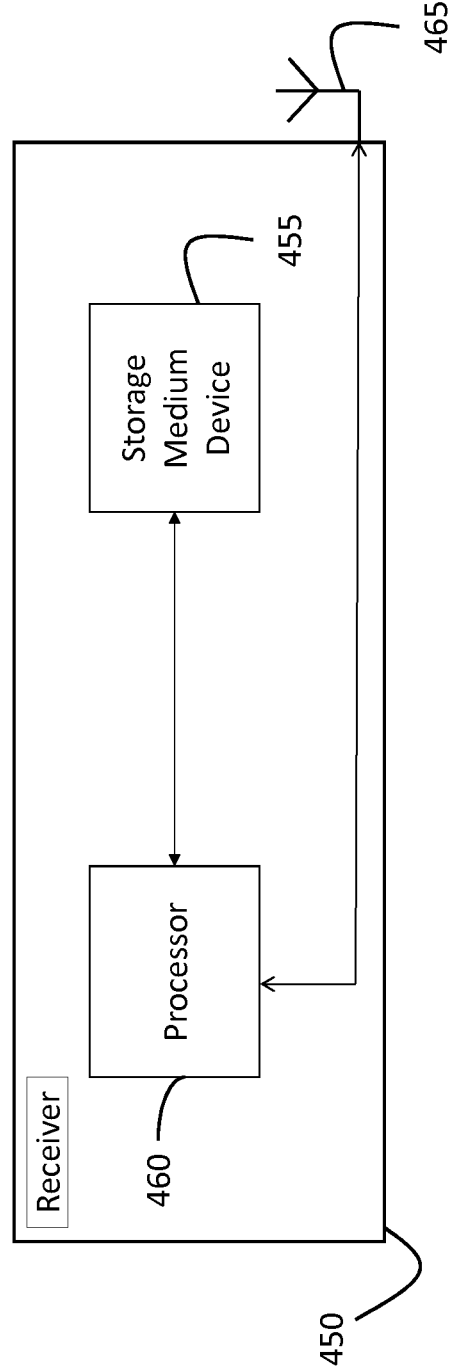
FIG. 4 illustrates a receiver for receiving signals of the second system shown in FIG. 1, according to an example embodiment.

FIG. 4 illustrates a receiver for receiving signals of the second system shown in FIG. 1, according to an example embodiment. In the example embodiment described above with reference to FIG. 1, the second system 130 is described as a wireless communications system. However, as mentioned, the second system 130 is not limited to a wireless communications system.

The receiver 450 shown in FIG. 4 may be a receiver at any one of the components in the second system 130 of FIG. 1 that is to receive a signal transmitted according to the technology based on which the second system 130 operates. For example, the receiver 450 shown in FIG. 3 may be a receiver at the UE 134, a receiver at the wireless access node 132 or a receiver at any other network component within the second system 130.

As shown in FIG. 4, the receiver 450 may include a storage medium device 455, a processor 460 and an antenna 465. While FIG. 4 illustrates the receiver 450 as including three components, example embodiments are not limited thereto and the receiver 450 may include any number of additional components necessary for performing various functions within the second system 130.

The storage medium device 455 may store, among other information, a set of computer-readable instructions and parameters for determining a signal of the second system 130 transmitted to the receiver 450, as will be described below.

The processor 460 may execute the set of computer-readable instructions for performing the functions necessary to determine a signal of the second system 130 transmitted to the receiver 450, as will be described below. Accordingly, the execution of the computer-readable instructions by the processor 460 may transform the processor 460 into a special purpose processor for performing the underlying functions. In addition to determining the signal of the second system 130 in presence of interference signal 140 described above with reference to FIG. 1, the processor 450 may further execute additional computer-readable instructions for processing information associated with the received signal, as will be further described below.

The antenna 465 may be any known or to be developed antenna installed/incorporated into the receiver 450 (which may vary depending on the component of the second system 130 in which the receiver 450 is embedded). The antenna 465 may be used to receive signals (which may be a mixture of the signal of the second system 130 as well as interference induced by an overlappingly transmitted signal of the first system 120 (in the form of interference signal 140 discussed above with reference to FIG. 1, as well as additional noise interference)). The antenna 465 may additionally be used to transmit data/information/signals to other components of the second system 130 (e.g., the antenna 465 may be a transceiver antenna).

Prior to describing example embodiments directed to determining/estimating a particular signal from mixed signal received at a receiver (the mixed signal including an overlappingly transmitted signal of a different technology), several definitions and conditions for doing so are defined first.

As mentioned above, example embodiments provide spectrum sharing algorithms between systems operating based on different technologies (e.g., wireless communications and radar technologies). For example, the spectrum sharing algorithms enable determining a corresponding signal by one of the different systems in presence of interference from overlappingly transmitted signals of other systems, as Fast Transforms (such as Fast Fourier Transform (FFT)-based, Discrete Cosine Transform (DCT)-based, Wavelet-based) iterative solutions to an optimization cost function. Example embodiments of spectrum sharing methods described herein may be applied by each of the different systems (i.e., may be implemented at a receiver in each of the different systems) without any prior communications between the different systems. However, in some example embodiment, minimal amount of priori information may also be shared among components of the different systems.

Hereinafter, example embodiments will be described with respect to radar and wireless communications systems as specific examples of the different technology-based systems (e.g., systems 120 and 130 of FIG. 1, described above) that may co-exist and overlap in spectrum for transmission of signals. However as indicated, the first and second systems 120 and 130 may be any two systems operating based on different technologies.

In example embodiments described hereinafter, a radar system (i.e., the first system 120 described above with reference to FIG. 1) is assumed to transmit a periodic series of pulses where the interval between each successive pulse is denoted as T. Furthermore, a pulse repetition interval (PRI) is defined as the interval between each successive pulse with the inverse thereof being denoted as the pulse repetition frequency (PRF). The PRF may be given by $f_r=1/T$. In such pulse radar system, a modulated pulsed waveform p(t) with a bandwidth $B_p$ may be transmitted every T seconds. In particular, p(t) may be a frequency, phase or amplitude modulated waveform or a combination thereof. For example, in many currently deployed radar systems, p(t) is a linear frequency modulated chirp signal. However, example embodiments described herein are applicable to other types of sampled transmittable waveforms. Furthermore, the example embodiments are not limited to periodically pulsed radars and may encompass non-periodically pulsed radars as well as continuous wave radars.

In order to propagate in the RF environment, p(t) may be up-converted to an appropriate carrier frequency before transmission thereof by a radar (e.g., the radar 124 shown in FIG. 1). Furthermore, the radar 124 may transmit a total of M (with M being a positive integer) pulses in a coherent pulse interval (CPI). The radar 124 may receive echoes from the M pulses, which may then be down-converted and sampled at a rate $B_h$ and stored in a data matrix y(m,l) by the radar receiver 122, where m denotes the $m^{th}$ pulse in a CPI and l indexes the range-cell return data. In one example embodiment, the data matrix y(m,l) may denote both the pulse/range matrix obtained prior to pulse compression or after pulse compression. Furthermore, the data matrix may be taken as a digital dataset after sampling of the returns of each PRI. Such data matrix, as is known in the art, may also be referred to as a slow-time/fast-time data matrix. Accordingly, the index l may denote the range-samples or fast-time data with the awareness that l is index for the scattered return of each PRI, and the index m may denote the pulse-samples or slow-time data.

In one example embodiment, $B_h$, which is the sampling rate used to obtain the fast-time data, is greater than the Nyquist bandwidth of p(t) for some signal processing tasks such as filtering. Furthermore, the received signal in the range dimension may be modeled as a linear convolution of the range reflectivity function and the modulated radar transmit pulse p(t). After demodulation of the echoes received from target objects (e.g., radar object of detection 126) and sampling, each row of the data matrix y(m,l) may represent a linear convolution of a waveform filter with the radar reflectivity of the scene. The term "scene" may refer to the radar object of detection 126, as shown in FIG. 1 and/or an area that is an antenna footprint such as the area 204 in FIG. 2.

In one example embodiment, the linear convolution represented by each row of the data matrix y(m,l) may be transformed into a circular convolution by appropriate zero-padding of a waveform filter and a complex baseband reflectivity. The waveform filter may be the transmit filter which generates the transmit pulse. Alternatively, the waveform filter may be the transmit filter convolved with the receiver transfer function response. The complex baseband reflectivity represents the reflectivity of the scene.

In addition to the scattered return PRI, the data matrix y(m,l) may also include additive system noise, where an overlappingly transmitted signal of another co-existing system (e.g., the wireless communications system) is part of the additive noise. Accordingly, the data matrix y(m,l) may also be referred to as the noisy data matrix y(m,l). The noisy data matrix y(m,l) may be written as:

$$y=h*_r x+w \qquad (1)$$

$$x,y,w \in \mathbb{C}^{N_d \times N_r}, h \in \mathbb{C}^{N_r} \qquad (2)$$

where the operation $*_r$ is the circular convolution operation performed on each row of the data matrix y(m,l), as shown in Equation (3) below.

$$y=h*_r x \Leftrightarrow y(m,l)=\Sigma_k h(k)x(m,\langle l-k \rangle_{N_r}) \qquad (3)$$

In Equation (1) above, w is composed of two components $w_n$ and $w_i$. The component $w_n$ denotes an additive system noise term which may be considered as white noise. The component $w_i$ represents interference induced by other devices (e.g., due to the interference signal 140 shown in FIG. 1). In general, w may be a colored noise process. Furthermore, in Equation (1) x is the complex baseband reflectivity of the radar scene with row dimension size of M, which is, as described above, the number of slow-time pulses. Moreover, in Equation (1) h, which is the waveform filter, is the sampled discrete signal obtained from sampling transmit pulse p(t) that has been through the receiver at the rate of $B_h$. One objective of example embodiments described herein, is to determine/estimate x from the received signal/data matrix y.

In one example embodiment and based on Equation (1), the sampled discrete signal h and each row of complex baseband reflectivity x are zero-padded to a length $N_r$, so that the linear convolution between the discrete signal h and any row of the complex reflectivity may be expressed as a circular convolution operation $*_r$ defined above in Equation (3). Similarly, each column in the data-matrix is zero-padded appropriately to a size $N_d$ (In one example embodiment, $N_d$ is greater than the number of pulses in a CPI) so that Doppler MTI filtering may be performed in the frequency domain without any wrap-around effects.

In example embodiment, the Fourier transform for Doppler and range, which is implemented as the FFT solution to an optimization problem, is used. The Fourier transform for Doppler is denoted as $F_D$ and the Fourier transform for range is denoted as $F_R$. The range Fourier transform $F_R$ is set to be a unitary transform, i.e., such that $$F_R^H F_R = I, F_R F_R^H = I \qquad (4a)$$

where $F^H$ denotes the complex conjugate transpose of F and I is the identity matrix with diagonal elements being equal to 1 and the remaining element being equal to zero.

The Doppler Fourier transform $F_D$ may be set to be an overcomplete Parseval transform, i.e., such that $$F_D^H F_D = I, F_D F_D^H \neq 1 \qquad (4b)$$

Where the operator $F_D$ is 'tall' and $F_D^H$ is 'wide', as is known in the art. $F^H$ and I are as described above with reference to Equations (4a). While $F_D$ has been described as an overcomplete transform in one example embodiment, example embodiments are not limited thereto. In example embodiments $F_D$, may be an undercomplete transform or a complete transform.

In one example embodiment, the range Fourier transform is applied along the rows of the data matrix y while the Doppler Fourier transform is applied on each individual column of the data matrix y. Because the range and Doppler Fourier transforms are applied along separate dimensions of a data matrix y, the range and Doppler Fourier transforms are said to commute. Accordingly, the range Fourier transform of the convolution of the sampled discrete signal h and the baseband reflectivity x is given by:

$$F_R(h*,x) = \sqrt{N_r}(H \odot_R X) \qquad (5)$$

Where $\odot_R$ is a point-wise multiplication and H and X are defined as the range Fourier transform of h and x. Furthermore, h and H are one dimensional vectors while x and X are two dimensional vectors (i.e., a matrix). In order for point-wise multiplication to be defined between H and X, the one dimensional vector H must be expanded to a two dimensional vector. Therefore, the operator $\odot_R$ is defined to expand H so as to have an equal number of rows as X, i.e., $$Y = H \odot_R X \Leftrightarrow Y(m,k) = H(k)X(m,k) \qquad (6)$$

where m is as defined above and k is an index in the range-frequency domain (which corresponds to the radio-frequency domain).

In operator notation, $\odot_R$ may be defined as:

$$H \odot_R X = \text{rpm}(H)X \qquad (7)$$

where rpm(H) is defined as 'range point-wise multiplication' and denotes the diagonal operator defined by (7), i.e.:

$$[\text{rpm}(H)X]_{m,k} = H(k)X(m,k) \qquad (8)$$

By applying Equation (7) to Equation (5), the following identity is obtained:

$$F_R(h*,x) = \sqrt{N_r}\text{rpm}(H)X \qquad (9)$$

Given the commuting property of the Doppler Fourier transform and range Fourier transform, as described above, the following identities may be established:

$$\text{rpm}(H)F_D = F_D \text{rpm}(H) \qquad (10)$$

$$\text{rpm}(H)F_D^H = F_D^H \text{rpm}(H) \qquad (11)$$

The energy metric, and the $l_2$ and $l_1$ norms of x may be written respectively as:

$$\|x\|_2^2 = \sum_m \sum_k |x(m,k)|^2, \|x\|_2 = \sqrt{\sum_m \sum_k |x(m,k)|}, \qquad (12)$$

$$\|x\|_1 = \sum_m \sum_k |x(m,k)|$$

where the two-norm applied element-wise on the elements of a matrix x may also be referred to as the Frobenius norm.

Using the Parseval's property known in the art, the $l_2$ norm of x may be written as:

$$\|x\|_2 = \|F_D x\|_2 = \|F_R x\|_2 \qquad (13)$$

In example embodiments described herein, x may also be considered the inverse Fourier transform of the range-Doppler profile of the input scene (e.g., the first signal to be determined/estimated from the received signal y), denoted by s:

$$x = F_D^H s \qquad (14)$$

where each row of s represents one Doppler Frequency and each column of s represents one range cell.

Accordingly, one objective of example embodiments described herein is to determine/estimate s when there is simultaneous transmission of signals by systems operating based on different technologies (e.g., signals transmitted by a wireless communications system and a radar system, described above with reference to FIG. 1).

Example embodiments for determining/estimating s include minimizing an inverse problem (e.g. minimize a cost function) with an appropriate data fidelity term, regularization term and an estimated noise statistics (the noise including the corresponding system noise $w_n$ as well as noise $w_i$ induced by an interfering and overlappingly transmitted signal of another system operating based on a different technology, as described above) such as the power spectral density of the noise. Accordingly, in order to determine/estimate s, a proper cost function may be formulated. The cost function may include, among other terms, a data fidelity term, a regularization term and an estimation of the noise statistics. Therefore, prior to describing example embodiments for determining/estimating s, a general discussion will be provided with respect to formulation of the cost function. Thereafter, the example processes of determining/estimating s will be described with reference to FIGS. 5 and 6.

First, a formulation of a cost function (which may also be referred to as an optimization cost function) is described. Optimization cost functions may be formulated in terms of analysis or synthesis regularization terms or a mixture thereof. Example embodiments herein are only meant to describe some specific cases of the formulation of such optimization cost functions and therefore, the choice of analysis or synthesis terms or a combination thereof presented herein, are demonstrative and not meant to be limiting. Alternatively, an optimization cost function may be formulated from a Bayesian estimation theory perspective and estimate the desired signal (e.g. through the maximum a posteriori (MAP) estimate). Such alternative formulations of the cost function and the corresponding solutions may be derived by those skilled in the art and example embodiments of the optimization cost function formulation presented herein, are meant to be demonstrative only and thus are not meant to be limiting.

In example embodiments, a cost function may be defined as J(s) shown in Equation (15) below, the solution to which provides an estimation of s denoted by ŝ given y.

$$\hat{s} = \operatorname*{argmin}_{s}\left\{J(s) = \frac{1}{2}\|y - F_D^H(h *_r s)\|_2^2 + \varphi(\lambda \odot s)\right\} \quad (15)$$

where $\frac{1}{2}\|y - F_D^H(h *_r s)\|_2^2$ is the data fidelity term using the energy metric, $\phi(z)$ is the regularization function (the determination of which will be described below), $\lambda$ is the regularization parameter, and the remaining notations used in Equation (15) are as defined above. Furthermore, ŝ in Equation (15) may be considered to be one of possible sets of values that minimize the cost function given by Equation (15).

Using Parseval's theorem, the convolution theorem, the commutative property of the range and Doppler Fourier transforms and Equations (10)-(14), the cost function J(s) of Equation (15) may be rewritten as below:

$$J(s) = \frac{1}{2}\|F_R(y - F_D^H(h *_r s))\|_2^2 + \varphi(\lambda \odot s) \quad (16)$$

$$= \frac{1}{2}\|F_R y - F_R F_D^H(h *_r s)\|_2^2 + \varphi(\lambda \odot s) \quad (17)$$

$$= \frac{1}{2}\|F_R y - F_D^H F_R(h *_r s)\|_2^2 + \varphi(\lambda \odot s) \quad (18)$$

$$= \frac{1}{2}\|F_R y - \sqrt{N_r} F_D^H(F_R h *_r F_R s)\|_2^2 + \varphi(\lambda \odot s) \quad (19)$$

$$= \frac{1}{2}\|Y - \sqrt{N_r} F_D^H(H \odot_R S)\|_2^2 + \varphi(\lambda \odot s) \quad (20)$$

$$= \frac{1}{2}\|Y - \sqrt{N_r} F_D^H \operatorname{rpm}(H)S\|_2^2 + \varphi(\lambda \odot s) \quad (21)$$

$$\frac{1}{2}\|Y - \sqrt{N_r} \operatorname{rpm}(H) F_D^H S\|_2^2 + \varphi(\lambda \odot s) \quad (22)$$

where Y, H, and S are defined as the range Fourier transforms of y, h and s, as shown in Equation (23).

$$Y = F_R y, H = F_R h, S = F_R s, \quad (23)$$

Hence, Equation (15) may be rewritten as:

$$\hat{s} = \operatorname{argmin}_s\{J(s) = \frac{1}{2}\|Y - \sqrt{N_r}\operatorname{rpm}(H)F_D^H S\|_2^2 + \phi(\lambda \odot s)\}, \quad (24)$$

where $S = F_R s$

The solution to Equation (24) may be obtained by using the Alternating Direction Method of Multipliers (ADMM). However, example embodiments are not limited to using ADMM and other methods may be used instead, including but not limited to, dual decomposition method, the method of multipliers, Douglas-Rachford splitting, Spingarn's method of partial inverses, Dykstra's alternating projections, Bregman iterative algorithms for $l_1$ problems, proximal methods, etc. Furthermore, other numerical and sparsity optimization methods in solving Equation (24) may be used.

Example advantages of ADMM include fast convergence, the use of fast transforms such as the FFT, and potentially avoiding the need for performing any matrix inversions or multiplications. In addition to the basic ADMM algorithm, example embodiments may apply variations of the ADMM, as is known in the art.

Using variable splitting, Equation (24) may be expressed as:

$$\hat{s} = \operatorname*{argmin}_{s}\left\{J(s) = \frac{1}{2}\|Y - \sqrt{N_r}\operatorname{rpm}(H)F_D^H S\|_2^2 + \varphi(\lambda \odot z)\right\} \quad (25)$$

such that s=z where $S = F_R s$

Using ADMM, the solution of Equation (25) may be obtained via a general algorithm given by:

$$z^{(j)} = \operatorname*{argmin}_{z}\left\{\varphi(\lambda \odot z) + \frac{\mu}{2}\|s^{(j-1)} - z - d^{(j-1)}\|_2^2\right\} \quad (26)$$

$$S^{(j)} = \operatorname*{argmin}_{S}\frac{1}{2}\|Y - \sqrt{N_r}\operatorname{rpm}(H)F_D^H S\|_2^2 + \frac{\mu}{2}\|F_R^H S - z^{(j)} - d^{(j-1)}\|_2^2 \quad (27)$$

$$s^{(j)} = F_R^H S^{(j)} \quad (28)$$

$$d^{(j)} = d^{(j-1)} - (s^{(j)} - z^{(j)}) \quad (29)$$

where $\mu$ and $\lambda$ are the step-size (also called multipliers) and regularization parameters, respectively. The regularization parameter may be a scalar or a higher dimensional vector and $\mu$ may be adaptable in each iteration. The variable d is an auxiliary ADMM variable used in the ADMM algorithm, as is known in the art.

In Equation (26), optimization is performed over the variable z while the values of s and d are updated in each iteration of the iterative algorithm. Similarly, in Equation (27), the optimization is performed over the variable S while using the new value obtained for z in Equation (26) and the value of d from the previous iteration. However in Equation (29), the update of the variable d is based on the new values obtained for s and z using d from the previous iteration.

In one example embodiment and in order to solve Equation (27), Equation (27) may be transformed into the Frequency domain using Equation (13). Accordingly, Equation (27) may be represented in the frequency domain as:

$$S = \operatorname*{argmin}_{S}\frac{1}{2}\|Y - \sqrt{N_r}\operatorname{rpm}(H)F_D^H S\|_2^2 + \frac{\mu}{2}\|S - Z - D\|_2^2 \quad (30)$$

where S, D, and Z are defined as the range Fourier transforms of s, z and d, respectively, as shown below.

$$S = F_R s, Z = F_R z, D = F_R d, \quad (31)$$

Equation (30) may be expressed as:

$$S = \operatorname*{argmin}_{S}\frac{1}{2}\|Y - AS\|_2^2 + \frac{\mu}{2}\|S - B\|_2^2 \quad (32)$$

where $$A = \sqrt{N_r}\operatorname{rpm}(H)F_D^H, \quad B = Z + D \quad (33)$$

The solution of Equation (32) (i.e., the radar signal to be determined/estimated from the received signal y) is given by:

$$S = (A^H A + \mu I)^{-1}(A^H Y + \mu B) \quad (34)$$

However, the operator $A^H A$ is not diagonal because of Equation (4b), so determination of the inverse of $(A^H A + \mu I)^{-1}$ is computationally complex. Accordingly, the matrix inverse lemma may be used to simplify the expression in Equation (34). The symbol "./" is used to denote element-wise division and the symbol ".^" is used to denote element wise multiplication. Therefore, the inverse of $(A^H A + \mu I)^{-1}$ in Equation (34) may be written as:

$$(A^H A + \mu I)^{-1} = \frac{1}{\mu} I - \frac{N_r}{\mu} F_D \text{rpm}(H^*)(\mu I + N_r \text{rpm}(H) \quad (35)$$

$$F_D^H F_D \text{rpm}(H^*))^{-1} \text{rpm}(H) F_D^H$$

$$= \frac{1}{\mu} I - \frac{N_r}{\mu} F_D \text{rpm}(H^*)(\mu I + N_r \text{rpm}(H) \quad (36)$$

$$\text{rpm}(H^*))^{-1} \text{rpm}(H) F_D^H$$

$$= \frac{1}{\mu} I - \frac{N_r}{\mu} F_D \text{rpm}(H^*)(\mu I + N_r \text{rpm}(|H|\hat{\ }2))^{-1} \quad (37)$$

$$\text{rpm}(H) F_D^H$$

$$= \frac{1}{\mu} I - \frac{N_r}{\mu} F_D \text{rpm}(H^*)(\text{rpm}(N_r |H|\hat{\ }2 + \mu))^{-1} \quad (38)$$

$$\text{rpm}(H) F_D^H$$

$$= \frac{1}{\mu} I - \frac{N_r}{\mu} F_D \text{rpm}(H^*) \text{rpm}(1./(N_r |H|\hat{\ }2 + \mu)) \quad (39)$$

$$\text{rpm}(H) F_D^H$$

$$= \frac{1}{\mu} I - \frac{N_r}{\mu} F_D \text{rpm}((N_r |H|\hat{\ }2 ./(N_r |H|\hat{\ }2 + \mu)) \quad (40)$$

$$F_D^H$$

A variable P may be defined as:

$$P = 1./\left(1 + \left(\frac{\mu}{N_r}\right)./|H|\hat{\ }2\right) \quad (41)$$

Accordingly, the solution of Equation (34) may be given by:

$$S = (A^H A + \mu I)^{-1}(A^H Y + \mu B) \quad (42)$$

$$= \left(\frac{1}{\mu} I - \frac{1}{\mu} F_D \text{rpm}(P) F_D^H\right)\left(\sqrt{N_r} F_D \text{rpm}(H^*) Y + \mu(Z + D)\right)$$

$$= (I - F_D \text{rpm}(P) F_D^H)\left(\frac{\sqrt{N_r}}{\mu} F_D \text{rpm}(H^*) Y + Z + D\right) \quad (43)$$

In simplifying Equation (43), a new variable R may be defined as:

$$R = \frac{\sqrt{N_r}}{\mu} F_D \text{rpm}(H^*) Y + Z + D \quad (44)$$

Then, Equation (43) may be rewritten as:

$$S = R - F_D \text{rpm}(P) F_D^H R \quad (45)$$

In one example embodiment, the variable R may also be rewritten as given below in Equation (46), which in turn may be used to rewrite Equation (45) as shown below in Equation (47).

$$R = \frac{\sqrt{N_r}}{\mu} F_D(H^* \odot_R Y) + Z + D \quad (46)$$

$$S = R - F_D(P \odot_R (F_D^H R)) \quad (47)$$

Next the determination of an appropriate regularization term is described. The regularization function $\phi(z)$ in equation (26) may be a reconfigurable function determined based on empirical studies or mathematical models. In one example embodiment, $\phi(z)$ is chosen to be a function that allows for simultaneous operation of radar and wireless communications systems. For example, the regularization function may be a combination of regularization functions with different regularization parameter weights. Furthermore, the regularization function $\phi(z)$ may be a sparsity promoting function such as the $l_1$ norm, the nuclear norm, group sparse functions, non-convex penalties, total variation (in range, Doppler, PRI, CPI or scan, etc.), sparsity in a transform domain such as wavelets and Fourier domains, sparsity using prior knowledge such as clutter maps, mixed norms, the Huber function, non-pure sparse functions, compound functions, sparsity in time-frequency transforms such as the short-time Fourier domain, etc., depending on the radar signal being transmitted and the radar scene to be reconstructed. Accordingly, particular choice(s) for the regularization function used in the present disclosure for the radar scenario in consideration, may easily be modified/replaced by other regularization functions that are known or are to be developed for achieving simultaneous transmission of radar and wireless communications systems based signals. Therefore, example embodiments are not limited to the specific choice(s) of the regularization function described herein.

Furthermore, while for purposes of describing example embodiments, an assumption is made that the data being regularized is in the Doppler-range domain, it is also possible to have the regularization function promote sparsity, group-sparsity, nuclear norm, total variation etc. on other domains such as the range-pulse domain. For example, by setting $F_D^H = F_D = I_D$, where $I_D$ operates on each column of the data matrix by returning the same column, the terms $F_D^H$, $F_D$ will no longer be included in Equations (15), (16) and the solutions given in Equations (46) and (47). Accordingly, x will be the same as s (i.e., x=s and therefore X=S) and Equation (27) is similarly solved in the range-pulse domain. Therefore, the algorithmic framework provided in example embodiments described herein is equally applicable to a penalty function set on multiple pulses in other domains such as the range-pulse domain and range only domain. An example embodiment, in which the algorithm is applied without using Doppler information in the range only domain, will be described later below.

Using the concept of proximity operator, Equation (26) may be re-written as:

$$\text{prox}_{\varphi,\lambda,\mu}(b) = \underset{z}{\text{argmin}}\left\{\varphi(\lambda \odot z) + \frac{\mu}{2}\|b - z\|_2^2\right\} \quad (48)$$

While closed-form expressions of the proximity operators of various functions exist in order to obtain a solution of Equation (48), if closed-form expressions are not derivable, example embodiments may apply other known or to be developed numerical optimization methods to obtain an estimate of the proximity operator in Equation (48).

As described above, example embodiments may utilize group-sparsity as the regularization function $\phi(z)$ in Equation (48) (Equation (49)). The pulse-range or Doppler-range data may have group sparsity. For example, an extended target may possess group range sparsity and a non-constant radar cross section (RCS) target may possess group Doppler sparsity. Example embodiments may use group-sparsity in Doppler-range although the same may be used in other domains such as pulse-range domain. Accordingly, it is appropriate to define φ(z) so to reflect the domain part.

In doing so, example embodiments utilize $K_D$ and $K_R$ to denote the number of Doppler bins and number of range bins respectively, to promote Doppler-range group sparsity. The group-sparsity technique is meant as an exemplary model of a group-sparse regularization function. To promote Doppler-range group sparsity, we define:

$$\varphi(z) = \sum_i \sum_n \psi(\|z(i+(0:K_D-1), n+(0:K_D-1))\|_2) \quad (49)$$

The two dimensional array $z(i+(0:K_D-1), n+(0:K_R-1))$ is a sub-array of z of size $K_D \times K_R$. The first element of the sub-array is $z(i,n)$. The penalty function ψ may be a convex or non-convex sparsity-promoting function, which may depend on one or more parameters as shown below in Equations (50)-(52).

$$\psi(t) = |t| \quad (50)$$

$$\psi(t; a) = \frac{1}{a}\log(1+a|t|) \text{ s.t. } a > 0 \quad (51)$$

$$\psi(t; a) = \frac{2}{a\sqrt{3}}\left(\tan^{-1}\left(\frac{1+2a|t|}{\sqrt{3}}\right) - \frac{\pi}{6}\right) \text{ s.t. } a > 0 \quad (52)$$

where Equations (51) and (52) are equal to Equation (50) (the L1 norm) when a=0. Equations (51)-(52) are examples of different penalty functions that may be used. However, example embodiments are not limited thereto and other known or to be developed sparsity promoting penalty functions may be utilized instead. In one example embodiment, a penalty function may be defined as a combination of penalty functions or a separate penalty function for each of the Doppler and range groups may be defined, with each overlapping or non-overlapping Doppler and range groups having different sizes.

Furthermore, for a>0, the sparsity promoting penalty functions defined by Equations (51) and (52) may promote a stronger sparsity than the sparsity promoting penalty function defined by Equation (50). Furthermore, the sparsity promoting penalty functions (51) and (52) may be non-convex.

Both Equations (15) and (25) contain a convex data fidelity term. If a non-convex regularization function for solving Equations (15) and Equation (25) is used, it is still possible to make the total cost function as convex by choosing a appropriately in Equations (51) and (52). For example, a may be selected such that the positive second derivative in the data-fidelity term balances against the negative second derivative in the non-convex regularizer function.

In yet another example embodiment, choosing $K_R=1$ and $K_D=1$, and using Equation (50), the $l_1$ norm may be obtained, which is applied on each element of the matrix z as defined above, given by Equation (53) below.

$$\varphi(z) = \sum_i \sum_n |z(i,n)| \quad (53)$$

Using this regularization function, the proximity operator given in Equation (48) is the soft threshold function on each element of z.

The regularization parameter λ in Equation (15) may be a scalar or a higher dimensional vector. For higher dimensional vectors, the regularization parameter may be applied element-wise for some regularization functions such as the $l_1$ norm and may be cast in a vector or matrix form. For example, the regularization parameter may be a matrix λ for the $l_1$ norm and may be written as:

$$\varphi(\lambda \odot z) = \sum_i \sum_n \lambda(i,n)|z(i,n)| \quad (54)$$

where the proximity operator for such a case is soft-threshold applied element-wise with the threshold parameter being λ(i,n). Consequently, such extension of the regularization parameter is obvious to those skilled in the arts and the proximity operator defined in Equation (48) is meant to also cover cases when the regularization parameter may be a non-scalar parameter such as vector or matrix.

As discussed above, it may be possible that Equation (48) does not have a closed form solution for some regularization functions such as regularization functions given in Equations (49) and (50-52) when the Doppler-range group sizes are more than 1 element. In such case and in order to obtain a solution to Equation (48) for the regularization function of Equation (49), a pulse filtering convolution operator $*_d$ is defined. The operator $*_d$ has analogous properties to $*_r$ but is applied on the pulse dimension (i.e., on each column of the data matrix y). The pulse filtering convolution function may be given by:

$$g *_D x \Leftrightarrow \sum_k g(k) x(\langle m-k \rangle_{N_d}, l) \quad (55)$$

where x is in the range-pulse domain.

Appropriate zero-padding may be used in the pulse domain in a similar manner as described above with respect to the range domain in order to convert a linear convolution into a circular convolution. Consequently, the pulse filtering convolution may be implemented in Doppler Frequency domain by point-wise multiplication, as shown below in equation (56):

$$F_D(g *_D x) = \sqrt{N_D}(F_D g \odot_D F_D x) = \sqrt{N_D} G \odot_D s \quad (56)$$

where G is the Doppler Fourier transform of the vector g, and s is the Doppler Fourier transform of x. In Equation (56) g and G are one-dimensional vectors while x and s are two-dimensional vectors. Hence, for point-wise multiplication to be defined, the one dimensional vector is expanded to a two dimensional vector. Therefore, an operator $\odot_D$ to expand the G vector so as to have equal number of columns as s, is provided by Equation (57) below.

$$G \odot_D s \Leftrightarrow G(i) s(i,k) \quad (57)$$

A Majorization-Minimization (MM) algorithm may be used to solve Equation (48) for the regularization function given by Equation (49). The Majorization-Minimization (MM) algorithm may allow for the elements of the group in Equation (49) to be weighted differently. In doing so, Doppler and Range kernals may be defined as:

$$p_D = [p_D(1), \ldots, p_D(K_D)] \text{ with a length of } K_D \quad (58)$$

$$p_R = [p_R(1), \ldots, p_R(K_R)] \text{ with a length of } K_R \quad (59)$$

where $p_D$ and $p_R$ may be conventional symmetric digital signal processing (DSP) windows such as the triangular or Hamming window. However, those skilled in the art appreciate that different weighting functions may be used for $p_D$ and $p_R$ instead of the conventional DSP windows.

An iterative algorithm to solve Equation (48) for the regularization function given by Equation (49) may be given by:

$$q = (p_D^*{}_D p_R^*{}_R (|z| \cdot)^{\cdot 2})^{\cdot 1/2} \quad (60)$$

$$v = 1 + \lambda((p_D^*{}_D p_R^*{}_R 1 \cdot / \theta(q))) \quad (61)$$

$$z = b \cdot / v \quad (62)$$

where z is initialized to be equal to b and Equations (60)-(62) are repeated until a convergence condition/criteria (which may be determined based on empirical studies) is satisfied. Furthermore, the operator $|z| \cdot$ on a vector or matrix is defined as taking the absolute value of each element z. In Equations (60)-(62), the operation designated by dot ($\cdot$) denotes element-wise operation. Furthermore, the function $\theta$ is defined as:

$$\theta(t) = \frac{t}{\psi'(t)} \quad (63)$$

where $\psi'(t)$ is derivative (whenever it is defined) of the penalty function $\psi(t)$ of the group of coefficients in the range-Doppler domain. In the example embodiment of the iterative algorithm described above, $\theta(q)$ is applied element-wise to each element of the array q. While the iterative algorithm of Equations (60)-(62) has not been solved in the frequency domain, due to the expectation that the group sizes and the kernel weights have relatively small lengths, for large group sizes, Equation (61) and (62) may be solved in the range-frequency and Doppler-frequency domains.

Satisfying the convergence criteria may be detected by different methods. For example, satisfying the convergence criteria may be achieved by monitoring the change in z using an appropriate norm (for example the Frobenius norm). Alternatively, a fixed number of iterations may be used as the convergence criteria. However, the convergence criteria is not limited to the examples provided above and may include any other convergence criteria.

As another example of a regularization function, a Doppler filter within the regularization function may be considered. The Doppler filter may be used to remove ground clutter for the purpose of moving target indication (MTI) or conversely enhance near zero-Doppler targets by removing fast moving targets. Accordingly, Equation (25) may be rewritten as:

$$\hat{s} = \underset{s}{\operatorname{argmin}} \left\{ J(s) = \frac{1}{2} \left\| Y - \sqrt{N_r}\, \mathrm{rpm}(H) F_D^H S \right\|_2^2 + \varphi(\lambda \odot G \odot_D s) \right\} \quad (64)$$

The effect of the regularization function $\varphi(G \odot_D s)$ given in Equation (64) is that it enhances target detection if the targets are expected to be outside of a particular Doppler band. For example, in one embodiment G may be zero (0) for some Doppler frequencies and one (1) for other Doppler frequencies. Such regularization functions may be appropriate when the ground-clutter of the scene is not sparse but the objective of the radar is to detect a sparse number of targets whose Doppler frequency partially overlaps or does not overlap the ground clutter Doppler spectrum.

In one example embodiment, if the regularization function $\varphi$ is considered the $l_1$ norm, the proximal operator in Equation (48) for $\varphi(G \odot_D s)$ is given by:

$$z(i, k) = \mathrm{soft}\!\left(b(i, k), |G(i)|\frac{\lambda}{\mu}\right) \text{ for all } i, k \quad (65)$$

where the soft-thresholding is applied element-wise.

Next, a modeling of the noise and interference is described. As described above, the noise/interference may be considered to include both the corresponding system noise (e.g., the corresponding wireless communications system noise or the radar system noise) as well as the interference signal 140, described above with reference to FIG. 1 and in Equation (1).

The noise of the radar system 120 at the receiver front-end may be modelled as a white Gaussian noise. However, after receiver filtering, up sampling and other RF and signal processing processes, the noise may not have a flat-spectrum. Furthermore, for simultaneous operation of radar and wireless communications systems, the signal associated with the wireless communications systems as seen by the radar system may be modelled as colored noise/interference. Accordingly, the noise w consists of the total noise process from both the radar receiver chain $w_n$ (i.e., system noise) and the wireless interference $w_i$ (i.e., interference induced by the wireless communications system on radar signals of the radar system) up to where the optimization algorithm is performed. The power spectral density (PSD) of w may be denoted by $P_w$. Since w depends on the RF frequency, the power spectral density of the total noise process varies across the range-frequency. In one example embodiment, the length of $P_w$ equals $N_r$, which is the length of the range-Fourier transform $F_R$ (The range-Fourier transform is equivalent to the base-band frequencies of the signal for each pulse). To account for this colored noise, the baseband frequencies of the data fidelity may be weighted as a function of $P_w$. In one example embodiment, the square root of the reciprocal of $P_w$ may be used as the weight factor while use of other methods of weighting the frequencies of the data fidelity term based on the power spectral density of the total noise (consisting of system noise and overlappingly transmitted signals associated with a co-existing wireless communications system), is apparent to those having ordinary skill in the art. In one example embodiment, frequencies that do not correspond to a stationary process may be notched out by setting values of $P_w$ to infinity (e.g., in practice to a very large value). Using, the reciprocal of $P_w$, Equation (25) may be modified as follows:

$$\hat{s} = \underset{s}{\operatorname{argmin}} \quad (66)$$
$$\left\{ J(s) = \frac{1}{2} \left\| (1. / \sqrt{P_w}) \odot_R (Y - \sqrt{N_r}\, \mathrm{rpm}(H) F_D^H S) \right\|_2^2 + \varphi(\lambda \odot s) \right\}$$
where $S = F_R s$ Equation (66) may be further simplified using Equations (7) and (8), as shown below:

$$\hat{s} = \underset{s}{\operatorname{argmin}}\left\{J = \frac{1}{2}\left\|\operatorname{rpm}(1./\sqrt{P_w})(Y - \sqrt{N_r}\operatorname{rpm}(H)F_D^H S)\right\|_2^2 + \varphi(\lambda \odot s)\right\} \quad (67)$$

$$= \underset{s}{\operatorname{argmin}}\frac{1}{2}\left\|\operatorname{rpm}(1./\sqrt{P_w})(Y - \sqrt{N_r}\operatorname{rpm}(1./\sqrt{P_w})\operatorname{rpm}(H)F_D^H S)\right\|_2^2 + \varphi(\lambda \odot s) \quad (68)$$

$$= \underset{s}{\operatorname{argmin}}\frac{1}{2}\left\|(1./\sqrt{P_w})\odot_R Y - \sqrt{N_r}\operatorname{rpm}(H./\sqrt{P_w})F_D^H S\right\|_2^2 + \varphi(\lambda \odot s) \quad (69)$$

$$= \underset{s}{\operatorname{argmin}}\frac{1}{2}\left\|(\tilde{Y} - \sqrt{N_r}\operatorname{rpm}(\tilde{H})F_D^H S\right\|_2^2 + \varphi(\lambda \odot s) \quad (70)$$

where $$\tilde{Y} = (1./\sqrt{P_w})\odot_R Y, \quad \tilde{H} = H./\sqrt{P_w} \quad (71)$$

Since the cost function of Equation (70) has the same form as the cost function of Equation (25), the same optimization algorithm for the white-noise case may be used in the colored noise/interference case with the change of variables indicated in Equation (71) for the colored noise/interference case.

The interference coming from the wireless communications system into the radar band and seen by the radar receiver 122 maybe generally modelled as a colored stationary stochastic process (white noise being a special case of a colored stationary stochastic process). In one example embodiment, having a model of such interference from wireless communications systems stored at the radar receiver 122, enables the radar receiver 122 to use the stored model to estimate the radar signal from the mixed interfered radar plus wireless communication signals. However, the model for the interference may not be available. Accordingly, the radar receiver 122 may over-estimate the power of the PSD, but may still allow for the recovery of the radar signal.

The PSD of the colored noise process from the wireless communications coming into the radar system may be obtained in several ways. For example, the radar receiver 122 may capture the second order statistics of the wireless communications system, which includes the PSD. Standard techniques to estimate the auto-correlation function from the time-series samples of the wireless communications data may also be used to obtain the PSD.

One example embodiment of obtaining the statistics of the interference induced on the radar signals by the overlappingly transmitted signals of the wireless communications system is for the radar to extend the PRI interval slightly and only use the fast-time samples obtained at the end of each return from a PRI when the scattering power from objects (e.g., radar object of detection 126 shown in FIG. 1) have decreased sufficiently (e.g., a margin below system operating noise level). Yet, another example embodiment of obtaining the interference statistics induced on the radar signals by the overlappingly transmitted signals of the wireless communications system is to estimate the in-band wireless communications signals via measurements of transmit-free or "listen-only" samples that represent stationary in-band interference during a transmit-free operation at specific intervals. However, if the interference statistics varies per each azimuth interval of a scan, a whole scan dedicated to a listening mode may be used to obtain the auto-correlation function for each azimuth sector of the radar 124.

In yet another example embodiment, the radar receiver 122 may obtain the statistics of the interference induced on the radar signals by the overlappingly transmitted signals of the wireless communications system, by knowing the location and distance of each wireless communications device (e.g., the UE 134 and/or the wireless access node 132 in FIG. 1) and using an absolute sum of the transmit power density formula for each device with a priori knowledge of the frequencies used for transmission by the wireless communication devices. This may correspond to an upper bound on the power spectral density. Other methods to set an upper bound on the maximum power assumed in each frequency that is used for spectrum sharing are known to those skilled in the art and are within the scope of the present application.

In yet another example embodiment, the radar receiver 122 may obtain the statistics of the interference induced on the radar signals by the overlappingly transmitted signals of the wireless communications system, by obtaining a priori knowledge of the frequencies used by wireless communications devices in a certain geographic location and setting the upper-bound for the power spectral density associated with such frequencies. Also further coordination between wireless communications system and the radar system may be performed to obtain the power spectral density of the wireless communications interference.

While example embodiments have been described in which the colored noise PSD is used as a weight factor in the data-fidelity term in order to obtain the best estimate of the range-Doppler matrix s, the PSD weight factor may be adapted on a sample by sample basis, pulse by pulse basis or multiple CPI basis rather than a single CPI. If the colored noise is stationary in a period less than a single PRI period, the maximum value of each frequency from a set of power-spectral densities obtained through an adaptive window may be selected as an upper-bound for the whole set of PSD functions. Alternatively, an average power-spectral density over a set of PSDs may be determined. Accordingly, the adaptation period for the colored noise/interference may be designed into the optimization algorithm as a matrix weight factor for the data-fidelity term, as appreciated by those having ordinary skill in the art.

Having described the formulation of the cost function, the data fidelity term, the regularization term and the system noise, hereinafter example embodiments for determining/estimating s will be provided.

Figure 5:
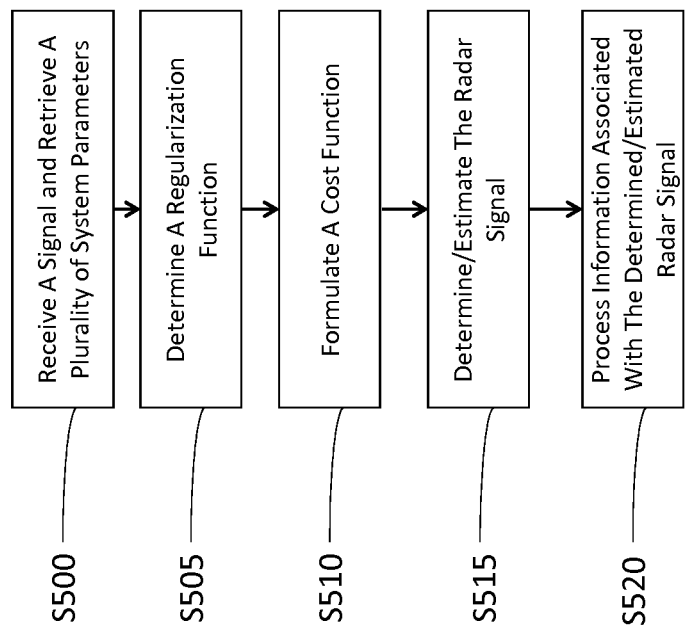
FIG. 5 is a flowchart describing a method of determining a signal in presence of interference induced by an overlappingly transmitted signal of a different technology, according to an example embodiment.

FIG. 5 is a flowchart describing a method of determining a signal in presence of interference induced by an overlappingly transmitted signal of a different technology, according to an example embodiment. For purposes of describing example embodiments, FIG. 5 will be described in conjunction with the radar receiver 122 of the first system 120 shown in FIG. 1. Furthermore, the functionalities of the radar receiver 122 described with reference to FIG. 5, will be implemented by the processor 350 of the radar receiver 122, when the processor 350 executes the computer-readable instructions stored on the storage medium 345 of the radar receiver 122.

At S500, the radar receiver 122 receives a signal y, as defined in Equation (1) above. The signal y may be a series of pulse/range samples with additive colored noise interference, which may also be referred to as slow-time/fast-time data matrix. Given that the signal y includes the underlying radar signal as well as the system noise and noise induced by the interference signal 140 described above with reference to FIG. 1, signal y may be referred to as a mixed signal. Furthermore, the radar receiver 122 may retrieve a plurality of system parameters from a memory of the radar receiver 122 (e.g., from the storage medium device 345 described above with reference to FIG. 3). The plurality of system parameters may be programmed and stored in the storage medium device 345. The plurality of system parameters may include the range-frequency spectrum (H) of a transmission pulse by the radar 124, a set of non-negative Doppler weights (G) as described above, and the PSD $P_w$ that includes the interference and the system noise, as described above.

At S505, the radar receiver 122 determines a regularization function $\varphi(s)$, as described above.

At S510, the radar receiver 122 formulates a cost function described above with reference to Equation (25), with Y and H of Equation (25) being replaced with $\tilde{Y}$ and $\tilde{H}$, respectively, as shown in Equation (72) below. The radar receiver 122 formulates the cost function based on the signal y, the regularization function $\varphi(s)$, determined at S505, as well as a regularization parameter and a step-size parameter.

More specifically, the formulated cost function may be represented by Equation (72) shown below.

$$\hat{s} = \underset{s}{\operatorname{argmin}}\left\{J(s) = \frac{1}{2}\left\|\left(\tilde{Y} - \sqrt{N_r}\, \operatorname{rpm}(\tilde{H})F_D^H S\right)\right\|_2^2 + \varphi(\lambda \odot s)\right\} \quad (72)$$

where $S = F_R s$

The setting of the regularization parameter $\lambda$ may depend on system parameters such as the noise variance of the system, the waveform filters used and the auto-correlation function of the colored noise. The value of the regularization parameter $\lambda$ may also be different for different regularization functions. One method of setting the regularization parameter $\lambda$ is through empirical studies that may be used for different scenarios of spectrum overlap, relative power of the non-overlapping spectrum portions, the waveform filter, etc.

Another method of setting the regularization parameter $\lambda$ is a formula based on system parameters. Another method of setting the regularization parameter $\lambda$ is to test several different values of the regularization parameter $\lambda$ and ascertain the optimal value of the regularization parameter $\lambda$, from among the test values of the regularization parameter $\lambda$, and the solutions of the costs function by means of statistical tests. For example, in wireless communications, the statistical test may be the cyclic redundancy check (CRC) and soft/hard error correction code metrics. In radar, the statistical test may be a function of the correlation between the transmit waveform and the estimated radar scene. Other statistical tests (e.g. generalized cross validation, the discrepancy principle, the L-curve criterion, normalized cumulative periodogram), which are known to those skilled in the art, may also be used. Henceforth, the choice of the regularization parameter $\lambda$ does not change the form of the optimization function and those skilled in the art may use such methods to set the regularization parameter $\lambda$ for different radar and wireless spectrum sharing scenarios.

The ADMM algorithm, which may be used in solving the cost functions formed at S510, will converge for any step-size parameter $\mu$. However the convergence rate may differ for different values of the step-size $\mu$. The step-size parameter $\mu$ may be chosen based on empirical studies or as a function of systems parameters (e.g. noise variance). Alternatively, the step-size parameter $\mu$ may be chosen adaptively in each iteration of the ADMM algorithm based on functions of the difference between variables in different iterations of the ADMM loop.

At S515, the radar receiver 122 determines/estimates a radar signal (first signal), represented by $\hat{s}$, as described above. In one example embodiment, the radar receiver 122 may determine/estimate $\hat{s}$ by applying an iterative process to find a solution to cost function represented by Equation (72) and hence determine/estimate $\hat{s}$. In one example embodiment, the radar receiver 122 applies the iterative process as described below.

The radar receiver 122 initializes a plurality of variables, one or more of which may be auxiliary variables defined for purposes of implementing the iterative process. For example, the radar receiver 122 sets the positive step-size parameter $\mu$ determined as described above. Similarly, the radar receiver 122 may set the regularization parameter $\lambda$ to the value of the regularization parameter $\lambda$ determined as described above. Furthermore, the radar receiver 122 may initialize variables $s^0$ and $d^0$ to zero.

Based on the initialized values, the radar receiver 122 may determine variables $\tilde{Y}$, $\tilde{H}$, P and $R_0$, as shown below:

$$\tilde{Y} = \left(1./\sqrt{P_w}\right) \odot_R (F_R y) \quad (73)$$

$$\tilde{H} = H./\sqrt{P_w} \quad (74)$$

$$P = 1./\left(1 + \left(\frac{\mu}{N_r}\right)./|\tilde{H}|^{\wedge 2}\right) \quad (75)$$

$$R_0 = \frac{\sqrt{N_r}}{\mu} F_D(\tilde{H}^* \odot_R \tilde{Y}) \quad (76)$$

Furthermore, the radar receiver may define an auxiliary variable "j" and initialize j to 0. The variable j may indicate the number of iterations of the iterative process. Furthermore, the radar receiver may determine a regularization function, which may be the $l_1$ norm.

Thereafter, for j varying between 0 up to a number of iterations where a convergence criterion has been satisfied, the radar receiver 122, may repeat Equations (77)-(81). The convergence criteria may be as described above.

$$j = j + 1 \quad (77)$$

$$z^{(j)}(i,k) = \operatorname{soft}\left(s^{(j-1)}(i,k) - d^{(j-1)}(i,k), |G(i)|\frac{\lambda}{\mu}\right) \forall\, i, k \quad (78)$$

$$R^{(j)} = R_0 + F_R(z^{(j)} + d^{(j-1)}) \quad (79)$$

$$s^{(j)} = F_R^H(R^{(j)} - F_D(P \odot_R (F_D^H R^{(j)}))) \quad (80)$$

$$d^{(j)} = d^{(j-1)} - (s^{(j)} - z^{(j)}) \quad (81)$$

Upon the convergence criteria being met, the resulting $s^{(j)}$ at Equation (80) is the determined/estimated $\hat{s}$. The determined/estimated $\hat{s}$ may have two properties when the $l_1$ norm regularization function is used. First, a majority of the values of $\hat{s}$ are negligible in amplitude. Second, a minority of the values $\hat{s}$ are relatively larger in amplitude, thus indicating the determined/estimated radar pulses (first signal).

In another example embodiment, the radar receiver 122 may recover the radar pulses without using the Doppler frequency. For example, the phase of the oscillator of wireless communications devices may not be synchronized with that of the radar 124, or for some radar operations, even if the Doppler shifts are known, estimating the return for each PRI independent of other PRIs in the presence of wireless communications may not be possible. Accordingly, it is possible to recover multiple pulse returns or portion of a pulse return that is contaminated without using Doppler frequency information.

Upon determining/estimating the radar signal at S515, then at S520, the radar receiver 122 may process information associated with the determined radar signal. For example, the radar receiver 122 may analyze the determined radar signal to detect objects corresponding to the underlying purpose of the radar system, track/monitor variables/objects of interest (e.g., speed of cars, airplanes, ships, etc.). However, the processing of the radar signal is not limited to the examples described above but may encompass any appropriate type of analysis of the determined/estimated radar signal in order to extract/study/monitor information included in or associated with the determined/estimated radar signal.

Furthermore, while FIG. 5 has been described from the perspective of the radar system and the radar receiver thereof, FIG. 5 may be easily modified to be implemented at a receiver of another co-existing system (e.g., the wireless communications system 130 of FIG. 1). Accordingly, in such instance, the receiver at a given component of the wireless communications system 130 may determine/estimate the radar signal as described above at S515 and then subtract the determined radar signal from the received signal in order to determine underlying wireless communications signal.

Furthermore, when the process of FIG. 5 is applied at a receiver of a wireless communications system, the processing of information at S520 corresponds to processing of information associated with the determined wireless communications signal and not the determined/estimated radar signal.

Figure 6:
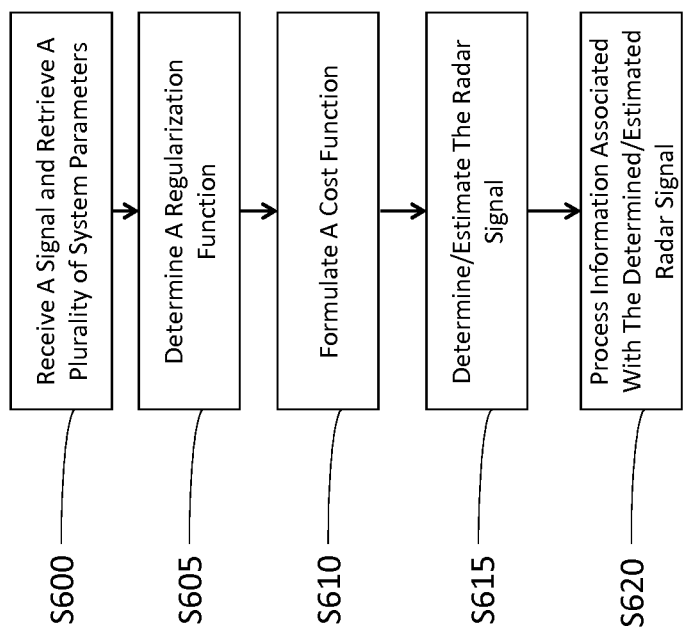
FIG. 6 is a flowchart describing a method of determining a signal in presence of interference induced by an overlappingly transmitted signal of a different technology, according to an example embodiment.

FIG. 6 is a flowchart describing a method of determining a signal in presence of interference induced by an overlappingly transmitted signal of a different technology, according to an example embodiment. For purposes of describing example embodiments, FIG. 6 will be described in conjunction with the radar receiver 122 of the first system 120 shown in FIG. 1. Furthermore, the functionalities of the radar receiver 122 described with reference to FIG. 6, will be implemented by the processor 350 of the radar receiver 122, when the processor 350 executes the computer-readable instructions stored on the storage medium 345 of the radar receiver 122.

At S600, the radar receiver 122 receives a signal y, as defined in Equation (1) above. In contrast to S500 of FIG. 5, at S600, the signal y may be a sampled time series. Given that the signal y includes the underlying radar signal as well as the system noise and noise induced by the interference signal 140 described above with reference to FIG. 1, signal y may be referred to as a mixed signal.

Furthermore, the radar receiver 122 may retrieve a plurality of system parameters from a memory of the radar receiver 122 (e.g., from the storage medium device 345 described above with reference to FIG. 3). The plurality of system parameters may be programmed and stored in the storage medium device 345. The plurality of system parameters may include the range-frequency spectrum (H) of a transmission pulse by the radar 124, a set of non-negative Doppler weights (G) as described above, and the PSD $P_w$ that includes the interference and the system noise, as described above.

At S605, the radar receiver 122 determines a regularization function $\phi(x)$, as described above.

At S610, the radar receiver 122 formulates a cost function as shown below with reference to Equation (83). The radar receiver 122 formulates the cost function based on the signal y, the regularization function $\phi(s)$, determined at S605, as well as a regularization parameter and a step-size parameter.

$$\hat{x} = \underset{x}{\operatorname{argmin}}\left\{\frac{1}{2}\left\|\tilde{Y} - \sqrt{N_r}\left(\tilde{H} \odot X\right)\right\|_2^2 + \varphi(\lambda \odot x)\right\} \quad (82)$$

where $\tilde{Y}$ is the frequency transform of time-series of samples y, zero-padded appropriately to $N_r$, in order to have the linear convolution as a circular convolution.

The setting of the regularization parameter $\lambda$ may depend on system parameters such as the noise variance of the system, the waveform filters used and the auto-correlation function of the colored noise. The value of the regularization parameter $\lambda$ may also be different for different regularization functions. One method of setting the regularization parameter $\lambda$ is through empirical studies that may be used for different scenarios of spectrum overlap, relative power of the non-overlapping spectrum portions, the waveform filter, etc.

Another method of setting the regularization parameter $\lambda$ is a formula based on system parameters. Another method of setting the regularization parameter $\lambda$ is to test several different values of the regularization parameter $\lambda$ and ascertain the optimal value of the regularization parameter $\lambda$, from among the test values of the regularization parameter $\lambda$, and the solutions of the costs function by means of statistical tests. For example, in wireless communications, the statistical test may be the cyclic redundancy check (CRC) and soft/hard error correction code metrics. In radar, the statistical test may be a function of the correlation between the transmit waveform and the estimated radar scene. Other statistical tests (e.g. generalized cross validation, the discrepancy principle, the L-curve criterion, normalized cumulative periodogram), which are known to those skilled in the art, may also be used. Henceforth, the choice of the regularization parameter $\lambda$ does not change the form of the optimization function and those skilled in the art may use such methods to set the regularization parameter $\lambda$ for different radar and wireless bandwidth sharing scenarios.

The ADMM algorithm, which will be used in solving the cost function formed at S610, will converge for any step-size parameter $\mu$. However the convergence rate may differ for different values of the step-size $\mu$. The step-size parameter $\mu$ may be chosen based on empirical studies or as a function of systems parameters (e.g. noise variance). Alternatively, the step-size parameter $\mu$ may be chosen adaptively in each iteration of the ADMM algorithm based on functions of the difference between variables in different iterations of the ADMM loop.

At S615, the radar receiver 122 determines/estimates a radar signal (first signal). In one example embodiment, the radar receiver 122 may apply an iterative process in order to determine/estimate $\hat{x}$. In one example embodiment, the radar receiver 122 applies the iterative process as described below.

The radar receiver 122 may determine variables $\tilde{Y}$, $\tilde{H}$, P and R, as shown below:

$$\tilde{Y} = (1./\sqrt{P_w}) \odot (Fy) \quad (83)$$

$$\tilde{H} = H./\sqrt{P_w} \quad (84)$$

$$P = 1./\left(1 + \left(\frac{N_r}{\mu}\right)|\tilde{H}|^{\wedge 2}\right) \quad (85)$$

$$R = \frac{\sqrt{N_r}}{\mu}(\tilde{H}^* \odot \tilde{Y}) \quad (86)$$

Furthermore, the radar receiver 122 may define an auxiliary variable "j" and initialize j to 0. The variable j may indicate the number of iterations of the iterative process. Furthermore, the radar receiver may determine a regularization function, which may be the $l_1$ norm.

Thereafter, for j varying between 0 up to a number of iterations where a convergence criterion has been satisfied, the radar receiver 122 may repeat Equations (87)-(91). The convergence criteria may be as described above.

$$j = j + 1 \quad (87)$$

$$v^{(j)} = \text{soft}\left(x^{(j-1)} - d^{(j-1)}, \frac{\lambda}{\mu}\right) + d^{(j-1)} \quad (88)$$

$$X^{(j)} = (Fv^{(j)} + R) \odot P \quad (89)$$

$$x^{(j)} = F^H X^{(j)} \quad (90)$$

$$d^{(j)} = v^{(j)} - x^{(j)} \quad (91)$$

Upon the convergence criteria being met, the resulting $x^{(j)}$ at Equation (91) is the determined/estimated $\hat{x}$. The determined/estimated $\hat{x}$ may have two properties when the $l_1$ norm regularization function is used. First, a majority of the values of $\hat{x}$ are negligible in amplitude. Second, a minority of the values $\hat{x}$ are relatively larger in amplitude, thus indicating the determined/estimated returned radar pulses.

Upon determining/estimating the radar signal at S615, then at S620, the radar receiver 122 may process information associated with the determined radar signal. For example, the radar receiver 122 may analyze the determined radar signal to detect objects corresponding to the underlying purpose of the radar system, track/monitor variables/objects of interest (e.g., speed of cars, airplanes, ships, etc.). However, the processing of the radar signal is not limited to the examples described above but may encompass any appropriate type of analysis of the determined/estimated radar signal in order to extract/study/monitor information included in or associated with the determined/estimated radar signal.

Furthermore, while FIG. 6 has been described from the perspective of the radar system and the radar receiver thereof, FIG. 6 may be easily modified to be implemented at a receiver of another co-existing system (e.g., the wireless communications system 130 of FIG. 1). Accordingly, in such instance, the receiver at a given component of the wireless communications system 130 may determine/estimate the radar signal as described above at S615 and then subtract the determined radar signal from the received signal in order to determine underlying wireless communications signal.

Furthermore, when the process of FIG. 6 is applied at a receiver of a wireless communications system, the processing of information at S620 will correspond to processing of information associated with the determined wireless communications signal and not the determined/estimated radar signal.

The processing of information associated with the determined signal at S520 and S620 depends on the underlying system at which the processes described in FIG. 5 and/or FIG. 6 are implemented.

While FIGS. 5 and 6 are described above with reference to the radar receiver 122, example embodiments are not limited thereto. For example the methods described above with reference to FIGS. 5 and 6, may be implemented at a receiver in any one of the system components of a wireless communications system such as the second system 130 shown in FIG. 1 (e.g., a receiver of any one of the UEs 134, the receiver of the wireless access node 132, etc.). Accordingly and as described above, such receiver at a component of the second system 130 may determine interfering signal(s) (e.g., the interfering radar signal) in a similar manner as described in example embodiments above and thereafter subtract the determine signal(s) (combination of the determined radar signals in case of having more than one interfering radar signal) from the received signal, in order to determine the wireless communications signal (e.g., signal 136 as described above with reference to FIG. 1, and process information associated with the determined wireless communications signal.

In some example embodiments, there may be more than one system of a particular technology. For example, in the setting shown in FIG. 1, there may be more than one radar system such as the system 120. In other words, there may be two radar systems 120 and the wireless communications system 130 whose signals may be simultaneously and overlappingly transmitted. Accordingly, a radar receiver 122 of any of the radar systems 120 may suppress the radar signals of the other one of the radar systems 120 (i.e., undesired radar signal) when implementing example embodiments for determining/estimating the corresponding radar signal (i.e., the desired radar signal). In this context, suppressing of a radar signal may be understood to include eliminating the influence of the undesired radar signal sufficiently so that the undesired radar signal induces minimal detrimental effect on determining/estimating the desired radar signal.

In one example embodiment, any of the radar systems 120 may suppress the undesired radar signals of the other radar system(s) 120 by adjusting power spectral densities in the cost function on frequencies on which the undesired radar signals of the other radar system(s) 120 are transmitted.

In one example embodiment, there may be more than one wireless communications system and a radar system. Accordingly, a receiver at a component of any of the wireless communications systems may suppress the signals associated with the other wireless communications system(s) (i.e., the undesired wireless communications signals), when determining the radar signal and subsequently the intended wireless communications signal.

In one example embodiment, the receiver at a component of any of the wireless communications systems may suppress the undesired wireless communications signals in a similar manner as described above with reference to the radar systems (e.g., adjusting power spectral densities in the cost function on frequencies on which the undesired wireless communications signals are transmitted).

In another example embodiment and when the undesired wireless communications signals are sparse, the receiver at a component of any of the wireless communications systems may suppress the undesired wireless communications signals by subtracting the sparse undesired wireless communications signals from the intended (desired wireless communications) signal.

Example embodiments described above provide numerous advantages over existing methods in the art, as described in the Background Section. Some of the example advantages are described below. The example advantages are described with respect to one or more of example embodiments described herein. However, example advantages are not meant to limit all example embodiments described herein. One or more example embodiments may provide advantages other than the example advantages described below.

One example advantage over the DSA and DFS technology, described in the Background Section, is that example embodiments allow for both types of systems to operate simultaneously, that is, the signals of the two different systems (e.g., wireless communications and radar systems) overlap in the time domain while overlapping partially or fully in frequency domain.

Another example advantage is that example embodiments allow for the radar and wireless communications systems to be minimally coordinated. The only coordination may be related to the radar transmission waveform in a setting of a simultaneous operation of the two systems. The radar transmission waveform may also be measured in both the radar and wireless communications system without coordination. While exchange of more information between the radar and wireless communications systems may improve performance of both systems in a simultaneous operation, doing so according to example embodiments, is not necessary.

Variations of the example embodiments are not to be regarded as a departure from the spirit and scope of the example embodiments, and all such variations as would be apparent to one skilled in the art are intended to be included within the scope of this disclosure.

What is claimed:
1. A device comprising:
   a memory configured to store computer-readable instructions therein; and
   a processor configured to execute the computer-readable instructions to,
      form a cost function associated with a signal received at the device, the signal including at least a first signal of a first system operating based on a first technology and a second signal of a second system operating based on a second technology, the second signal having been transmitted simultaneously with the first signal over the same frequency and time domains for reception by the device, the cost function being formed based on at least the received signal, a range-frequency spectrum associated with a transmission of the first signal, a set of Doppler weights, at least one regularization function, at least one data-fidelity term, at least one regularization parameter, a step-size parameter and a power spectral density of the second signal,
      determine the first signal from the signal based on the formed cost function, and
      determine the second signal based on the signal and the first signal, the determined second signal being used for processing of information associated with the second signal.

2. The device of claim 1, wherein the first signal and the second signal overlap spatially.

3. The device of claim 1, wherein the processor is further configured to,
   receive the signal, the signal including the first signal with additive noise corresponding to at least the second signal, and
   minimize the cost function associated with the received signal, wherein
   the processor is configured to determine the first signal as possible values of the first signal that minimize the cost function.

4. The device of claim 3, wherein the first signal is a radar fast-time/slow-time data matrix.

5. The device of claim 1, wherein
   the first system is a radar system and the first technology is a radar technology,
   the second system is a wireless communication system and the second technology is a wireless access technology,
   the device is a receiver of the wireless communications system,
   the first signal is a radar signal transmitted by a transmitter of the radar system, and
   the second signal is a signal transmitted by a transmitter of the wireless communications system.

6. The device of claim 5, wherein the wireless access technology is at least one of a wireless local area networking standard and a radio access technology.

7. The device of claim 5, wherein the processor is further configured to,
   receive the signal, the signal including the first signal, the second signal and at least one additional radar signal,
   determine the first signal and the at least one additional radar signal, and
   subtract a combination of the first signal and the at least one additional radar signal from the signal to determine the second signal.

8. The device of claim 7, wherein
   the wireless communications system is configured to operate simultaneously with at least one additional wireless communications system, and
   the processor is further configured to suppress wireless communications signals of the least one additional wireless communications system, when the processor determines the second signal.

9. The device of claim 1, wherein the first and second signals are transmitted by the first and second systems without coordination between the first and second systems.

10. A device comprising:
   a memory configured to store computer-readable instructions therein; and
   a processor configured to execute the computer-readable instructions to,
      form a cost function associated with a signal received at the device, the signal including at least a first signal of a first system operating based on a first technology and a second signal of a second system operating based on a second technology, the second signal having been transmitted simultaneously with the first signal over the same frequency and time domains for reception by the device, the cost function being formed based on at least the received signal, a frequency response of a filter associated with a transmission of the first signal, a regularization parameter, at least one regularization function, at least one data-fidelity term, at least one regularization parameter a step-size parameter and a power spectral density of the second signal, determine the first signal from the signal based on the formed cost function, and determine the second signal based on the signal and the first signal, the determined second signal being used for processing of information associated with the second signal.

11. The device of claim 10, wherein the first signal and the second signal overlap spatially.

12. The device of claim 10, wherein the processor is further configured to, receive the signal, the signal including the first signal with additive noise corresponding to at least the second signal, and minimize the cost function associated with the received signal, wherein the processor is configured to determine the first signal as possible values of the first signal that minimize the cost function.

13. The device of claim 12, wherein the first signal is a radar data time-series.

14. The device of claim 10, wherein the first system is a radar system and the first technology is a radar technology, the second system is a wireless communication system and the second technology is a wireless access technology, the device is a receiver of the wireless communications system, the first signal is a radar signal transmitted by a transmitter of the radar system, and the second signal is a signal transmitted by a transmitter of the wireless communications system.

15. The device of claim 14, wherein the wireless access technology is at least one of a wireless local area networking standard and a radio access technology.

16. The device of claim 14, wherein the processor is further configured to, receive the signal, the signal including the first signal, the second signal and at least one additional radar signal, determine the first signal and the at least one additional radar signal, and subtract a combination of the first signal and the at least one additional radar signal from the signal to determine the second signal.

17. The device of claim 16, wherein the wireless communications system is configured to operate simultaneously with at least one additional wireless communications system, and the processor is further configured to suppress wireless communications signals of the least one additional wireless communications system, when the processor determines the second signal.

18. The device of claim 10, wherein the first and second signals are transmitted by the first and second systems without coordination between the first and second systems.

* * * * *